United States Patent [19]
Ueda et al.

[11] Patent Number: 5,271,068
[45] Date of Patent: Dec. 14, 1993

[54] CHARACTER RECOGNITION DEVICE WHICH DIVIDES A SINGLE CHARACTER REGION INTO SUBREGIONS TO OBTAIN A CHARACTER CODE

[75] Inventors: Toru Ueda, Nara; Yasushi Ishizuka, Yamatokooriyama, both of Japan; Fumio Togawa, Hillsboro, Oreg.

[73] Assignee: Sharp Kabushiki Kaisha, Osaka, Japan

[21] Appl. No.: 871,075

[22] Filed: Apr. 20, 1992

Related U.S. Application Data

[62] Division of Ser. No. 667,340, Mar. 11, 1991, Pat. No. 5,151,951.

[30] Foreign Application Priority Data

Mar. 15, 1990 [JP] Japan ................................. 2-65055
Mar. 20, 1990 [JP] Japan ................................. 2-70345

[51] Int. Cl.[5] .......................... G06K 9/62; G06K 9/68
[52] U.S. Cl. ...................................... 382/30; 382/34
[58] Field of Search .................... 382/16, 19, 20, 25, 382/27, 30, 34, 36, 33

[56] References Cited

U.S. PATENT DOCUMENTS

| | | | |
|---|---|---|---|
| 4,014,000 | 3/1977 | Uno et al. | 382/25 |
| 4,153,897 | 5/1979 | Yasuda et al. | 382/34 |
| 4,490,850 | 12/1989 | Nally et al. | 382/34 |
| 4,503,557 | 3/1985 | Maeda | 382/34 |
| 4,628,533 | 12/1986 | Hongo et al. | 382/27 |
| 4,903,313 | 2/1990 | Tachikawa | 382/19 |
| 5,065,440 | 11/1991 | Yoshida et al. | 382/34 |

*Primary Examiner*—Michael T. Razavi
*Assistant Examiner*—David Fox
*Attorney, Agent, or Firm*—Nixon & Vanderhye

[57] ABSTRACT

A character reconginition device has a subdivider, a features calculator and a character code recognition device. Image data for a single character area is extracted from scanned character image data and input to the subdivider. This subdivider divides the image data for the single character area into subregions. The features calculator calculates quantified features in each subregion based on a degree of resemblance between a template and image data in the subregions. When the features of each subregion are calculated for all subregions constituting the single character area, a character code corresponding to the scanned character image data is recognized by the character code recognition device based on the quantified features of each of all subregions.

7 Claims, 16 Drawing Sheets

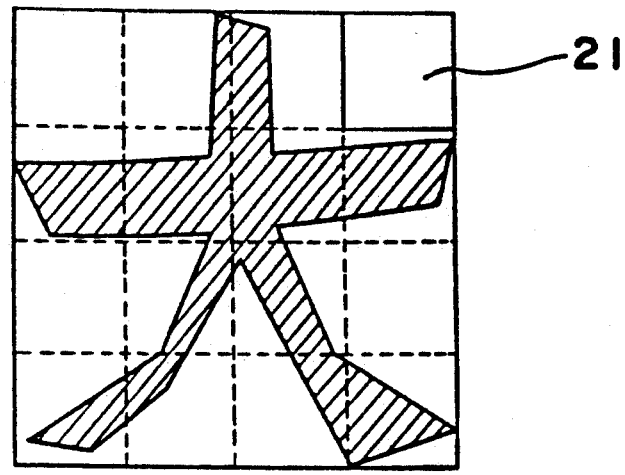
Fig. 3(a)
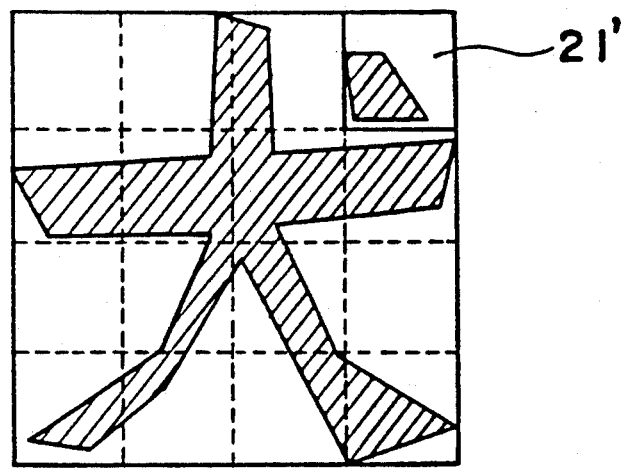
Fig. 3(b)
Fig. 3(c)  (1)   (2) 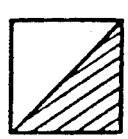  (3) 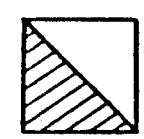  (4) 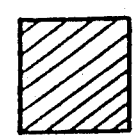

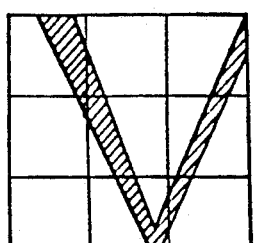
Fig. 13(a) FEATR PATT
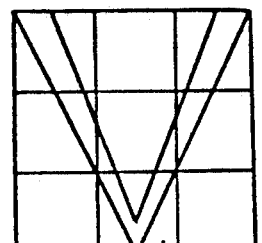
Fig. 13(b) STD PATT
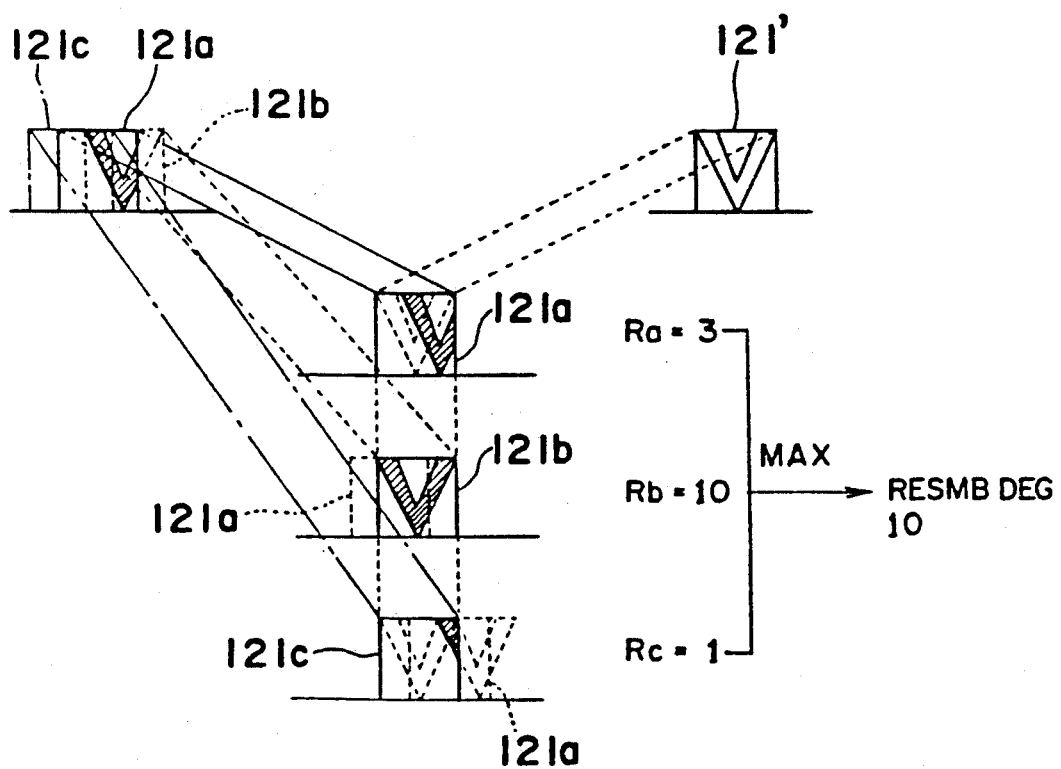
Fig. 14

Fig. 15 PRIOR ART
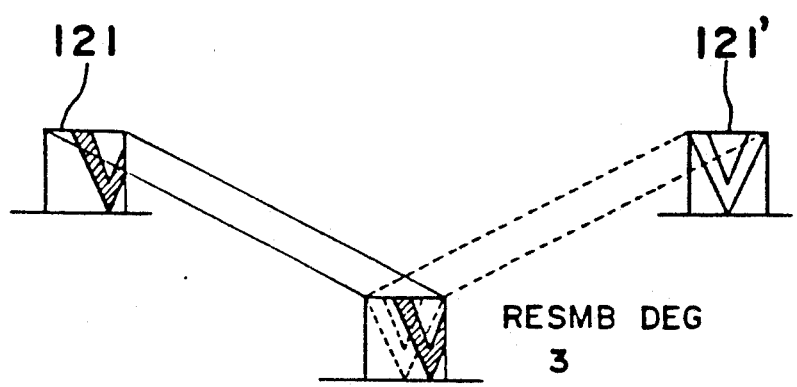
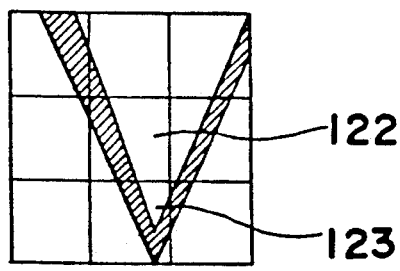
Fig. 17(a)
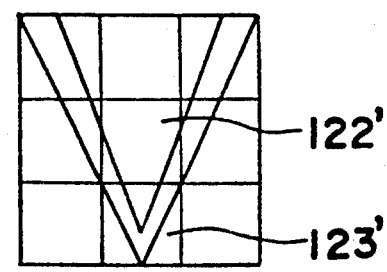
Fig. 17(b)

Fig. 21

| 大 | 犬 | 木 | 水 |
|---|---|---|---|
| DAI | INU | KI | MIZU |
| 太 | 状 | 伏 | |
| TAI | JOU | FUKU | |

CHARACTER RECOGNITION DEVICE WHICH DIVIDES A SINGLE CHARACTER REGION INTO SUBREGIONS TO OBTAIN A CHARACTER CODE

This is a division of application Ser. No. 07/667,340, filed 11 March 1991, now U.S. Pat. No. 5,151,951.

BACKGROUND OF THE INVENTION

The present invention relates to a character recognition device which divides into subregions the area of a single character in scanned character image data to obtain a character code based on a quantification of the features of the subregions.

A conventional character recognition device is described below. Specifically, each single character in the character image data scanned from a source text is divided into a series of contiguous rectangular subregions. The features of the image data in each of these subregions are then extracted, and the extracted feature data is used to determine the character code corresponding to the image data for that single character and thereby recognizes the scanned character.

One of the features of the image data evaluated in each subregion is average density, and a method which uses the average density as one feature of the subregion is the "mesh method". The mesh method determines the character code for the scanned character image data by generating a mesh pattern in which the feature is assigned a value of 1 when the average density of the subregion exceeds a predetermined threshold value, and is assigned a value of 0 when the threshold is not exceeded. The mesh pattern is then compared with standard character patterns similarly generated from the standard character image data for each of the possible candidate characters to count the number of subregions for which these assigned values differ. The character is thus recognized to be that character for which the number of differing subregions in the standard and scanned character patterns is smallest.

As thus described, character recognition devices employing a mesh method as above directly extract the features of each subregion from the image data in that subregion (i.e., the features are for the image data itself). As a result, when the characteristics of specific hiragana (one of the two Japanese "kana" syllabaries) are extracted, the features of a specific hiragana extracted from a sentence written only with hiragana, and the features of said same hiragana extracted from a sentence containing both hiragana and JIS level-1 kanji characters are the same.

However, the features of differences in character shape in a character group comprising only hiragana (of which the total is are 46 total) are different from the features of differences in character shape in a character group comprising both JIS level-1 kanji and hiragana (of which the total is approximately 3000). As a result, during recognition of a specific hiragana, the features recognized when that hiragana is part of a string consisting of only hiragana, and the features recognized when that hiragana is part of a string consisting of both hiragana and kanji may reasonably be expected to be different.

Because a conventional character recognition device as described above directly extracts the features of each subregion from the image data, it is possible to express the features of the image data in that subregion, but it is not possible to express the features of the differences in character shapes in the character recognition group. As a result, there is a difference in the ability to recognize a given character when said character is contained in a hiragana-only string and when the same character is contained in a mixed string of hiragana and JIS level-1 kanji.

In addition, because a single character is divided into a series of uniform contiguous rectangles when the area of a single character is divided into subregions, the character recognition performance of the device is also reduced during recognition of handwritten text because the positions of the lines composing the character will vary by each writer, causing lines composing the same character to occupy different subregions in the single character area of the standard character and the single character area of the character to be recognized.

Moreover, because the area of each rectangle is equal when the single character area is divided into subregions as described above, each subregion is not a shape which can contain elements in which the differences in character shapes in the character string being recognized are well expressed. Therefore, the features of these subregions cannot sufficiently express the character shape differences in the recognition character string, and when it is attempted to recognize characters based on the features of the subregions, it is necessary to obtain the features for all subregions comprising the single character area, thus resulting in low efficiency in the character recognition process.

SUMMARY OF THE INVENTION

Therefore, an object of the present invention is to provide a character recognition device which calculates the features of the subregions comprising a single character area so that character shape differences in the recognition character string can be appropriately expressed, has high character recognition performance for all character groups wherein the features of the character shape differences in the group differ, and has good character recognition efficiency.

In order to achieve the above object, there is provided a character recognition device which isolates the image data for a single character area from scanned character image data, and recognizes a character code corresponding to the character image data based on the image data of this single character area, and is characterized by a region divider which divides the image data of the single character area into plural subregions, a features calculator which calculates quantified features of each subregion based on degrees of resemblance between image data of each subregion divided by said region divider and templates which well express in each subregion differences in shape of characters in a recognition character group, and a character code recognition means which recognizes the character code corresponding to the scanned character image data based on the quantified features calculated by the features calculator in all subregions composing the single character area.

With a character recognition device according to the present invention, the image data for a single character area is extracted from the scanned character image data and input to the region divider. This region divider then divides the image data for the single character area into subregions. The features calculator then calculates the features in each subregion based on the degree of resemblance between a template and the image data in the subregions divided by the region divider. When the features of each subregion are calculated for all subregions comprising the single character area, the character code corresponding to the scanned character image data is recognized by the character code recognition means based on the quantified features of each of all subregions comprising this single character area.

Because the template is defined to well express the differences in character shapes in the recognition character group, the quantified features of each subregion calculated based on this template can well express the differences in character shapes in the recognition character group for each subregion. Therefore, the correct character code is recognized in all character groups wherein the features of the differences in character shapes in the group differ.

It is preferable that the region divider, when dividing the character image data of the single character area into subregions, generates the subregions so that adjacent subregions overlap.

According to structure as described above, when the character image data of a single character area is divided into subregions by the subregion divider, the subregions are formed so that adjacent subregions overlap.

Thus, when the positions of lines forming a given character vary as in handwritten text, and a line is positioned near the border of adjacent subregions, lines forming the same character will occupy the same subregion in the single character area of the recognition character and the standard character pattern. As a result, the degree of resemblance between the pattern of features in the recognition character and the standard pattern of the corresponding character will be increased.

Also, it is preferable that the region divider, when dividing the character image data of the single character area into subregions, generates the subregions to have various shapes so that places which well express differences in shapes of characters in a recognition character group are covered by the subregions.

According to the structure as described above, when the character image data of a single character area is divided into subregions by the subregion divider, the single character area is divided into subregions of various shapes containing elements in which the differences in character shapes in the recognition character group are well expressed.

Therefore, calculation of subregion features by the feature calculator is only applied to the subregions of the shapes divided to cover the elements in which the differences in character shapes in the recognition character group are well expressed, and is therefore executed with good efficiency and precision.

Furthermore, it is preferable that the character recognition device comprises a neural network which during training refreshes contents of a specified weight vector corresponding to an input training vector to approach the contents of the input training vector, and which trains the neural network using training vectors generated for each subregion based on character image data of plural training characters representative of the recognition character group, and defines as the templates used during calculation of the quantified features of the subregions by the feature calculator the weight vectors set, as a result of being refreshed to approach the contents of each training vector, to well express differences in shapes of characters in each of training characters representative of the recognition character group.

According to the structure as described above, training vectors based on the character image data of plural training characters representing the recognition character group are generated for each subregion. These training vectors are input to the neural network, and training is executed such that the contents of the weight vector approach the contents of the training vector. The weight vectors of the neural network are thus refreshed to well express the differences in character shapes in each of the training characters representing the recognition character group. Thus, the weight vectors set to well express the differences in character shapes in each of the training characters representing the recognition character group are used as a template during calculation of the subregion features by the feature calculator.

Therefore, a template which well expresses the differences in character shapes in the recognition character group is automatically generated by simply inputting the training vectors to the neural network.

It is preferable that the character code recognition means is a character identification neural network trained to identify a character code associated with an input vector when an input vector based on the quantified features calculated by the feature calculator in all subregions forming the single character area is input.

According to the structure as described above, the features of the subregions comprising a single character area are calculated by the feature calculator. Input vectors based on the features of all subregions comprising a single character area are thus automatically generated. The input vectors are then input to the character recognition neural network trained to recognize the character code with which the input vectors are associated. The character recognition neural network thus determines the character code with which the input vectors are associated, and the character code corresponding to the scanned character image data is recognized.

Therefore, the character code of the scanned character image data is recognized with a simple processing procedure, and does not require execution of a complex degree of resemblance calculation.

A further object of the present invention is to provide a character recognition device which without being provided with plural standard patterns for a single character has a high character recognition rate and can correctly calculate the degree of resemblance by compensating for offsetting when the features pattern of the scanned character is offset with respect to the standard pattern for the same character.

In order to accomplish the above object, there is provided a character recognition device which isolates image data for a single character area from scanned character image data, divides the image data of this single character area into plural subregions, calculates the quantified features of each subregion obtained, generates a feature pattern from the quantified features composing the single character area, and recognizes a character code corresponding to the character image data based on a degree of resemblance between this feature pattern and a standard pattern, and is characterized by a degree of resemblance calculator which calculates a degree of resemblance between a given subregion in the feature pattern of a recognition character and the corresponding subregion in a given standard pattern, and a degree of resemblance between an offset region offset a specified distance in a specified direction from said subregion in the feature pattern and said subregion in the standard pattern, a subregion degree of resemblance determination means which determines a maximum degree of resemblance calculated by the degree of resemblance calculator to be a degree of resemblance associated with said subregion in the feature pattern, and a degree of resemblance setting means which totals values of the degrees of resemblance associated with all subregions forming the feature pattern and determined by the subregion degree of resemblance determination means, and sets the obtained sum value as a degree of resemblance between the feature pattern and the standard pattern.

According to an embodiment as described above, the image data for one character area is extracted from the scanned character image data, the features of each subregion obtained by subdividing this single character area are quantified, and a features pattern for the single character is generated from the quantified features.

Thus, the degree of resemblance between any given subregion in the feature pattern of the character to be recognized and the region in any given standard pattern corresponding to said subregion, and the degree of resemblance between an offset region which is offset a specified distance in a specified direction from the subregion in the feature pattern and the corresponding region in the standard pattern, are determined. Then, it is determined by the subregion degree of resemblance determination means that the maximum degree of resemblance calculated by the degree of resemblance calculator is the degree of resemblance of the given subregion in the feature pattern. In addition, the degrees of resemblance of all subregions comprising the feature pattern confirmed by the degree of resemblance determination means are totaled by the degree of resemblance setting means, and the obtained sum is set as the degree of resemblance between the feature pattern and the standard pattern.

In this way, the degrees of resemblance between the feature pattern and plural standard patterns are set, and the character code corresponding to the character image data is confirmed based on the set degrees of resemblance.

Because the features are quantified for a specific subregion in a given feature pattern with consideration given to the degree of resemblance to an offset region offset from that subregion in the feature pattern, the offset of the position of the quantified feature in the subregion of the feature pattern to the position of the quantified feature in the same region of the standard pattern is compensated for, and the degree of resemblance to the subregion in the feature pattern is calculated.

Furthermore, it is preferable that the above character recognition device comprises a cost calculator which calculates a cost of such that the degree of resemblance associated with the offset region offset from the subregion in the feature pattern in the same direction as the position of quantified features in a near region of the feature pattern is offset with respect to the position of the quantified features in the region of the standard pattern corresponding to this near region is increased, and the degree of resemblance associated with the offset region offset from the subregion in the feature pattern in the opposite direction as the position of the quantified features in the near region of the feature pattern is offset with respect to the position of the quantified features in the region of the standard pattern corresponding to this near region is decreased, and a degree of resemblance compensation means which corrects the value of the degree of resemblance associated with the above subregion in the feature pattern, and the value of the degree of resemblance associated with the offset region which is offset from the subregion in the feature pattern, each degree of resemblance calculated by the degree of resemblance calculator, based on the value of the cost calculated by the cost calculator, such that when the degree of resemblance associated with the subregion of the feature pattern is determined by the subregion degree of resemblance determination means, this determination is made based on the degree of resemblance corrected by the degree of resemblance compensation means.

According to the structure as described above, based on the degree of resemblance of an adjacent subregion proximal to the subregion of the feature pattern and the degree of resemblance of an offset region offset a specific distance in a specific direction from the adjacent subregion in the feature pattern, each degree of resemblance being calculated by the degree of resemblance calculator, the degree of resemblance relating to an offset region offset from the subregion of the feature pattern in the same direction as the position of the quantified features in the adjacent subregion of the feature pattern is offset with respect to the position of the quantified feature in the region of the standard pattern corresponding to the adjacent subregion is increased, and the cost of reducing the degree of resemblance of the offset region offset from the subregion of the feature pattern in the direction opposite to the direction in which the position of the quantified feature in the adjacent region of the feature pattern is offset with respect to the position of the quantified feature in the region of the standard pattern corresponding to this adjacent subregion is calculated by a cost calculator.

Then, based on the value of the cost calculated by the cost calculator, the value of the degree of resemblance of the subregion of the feature pattern calculated by the degree of resemblance calculator, and the value of the degree of resemblance of the offset region offset from the subregion of the feature pattern are compensated for by the degree of resemblance compensator. Based on the degrees of resemblance corrected by the degree of resemblance compensator, the degree of resemblance of the subregion in the feature pattern is then determined by the subregion degree of resemblance determination means.

Because the degree of resemblance of an offset region offset from the subregion of the feature pattern in the same direction as the direction in which the position of the quantified feature in the adjacent subregions of the feature pattern is offset is increased as thus described, the effect is the same as offsetting the position of the quantified feature in the subregion of the feature pattern in the same direction as the position of the quantified feature in the adjacent subregion.

BRIEF DESCRIPTION OF THE DRAWINGS

The present invention will become more fully understood from the detailed description given below and the accompanying diagrams which are given by way of illustration only, and thus are not limitative of the present invention, and wherein:

FIGS. 3a-3c are a descriptive illustration of a template and subregions used by the device shown in FIG. 1;

FIGS. 13 (a) and (b) are figures showing one example each of a standard pattern and a feature pattern for which the degree of resemblance is calculated by a degree of resemblance calculator in FIG. 12;

FIG. 14 is a descriptive illustration of the degree of resemblance calculation process in the subregions in FIG. 13;

FIG. 15 is a descriptive illustration of a conventional degree of resemblance calculation process;

FIGS. 17a and 17b are a descriptive illustration of a standard pattern and a feature pattern resulting from a degree of resemblance calculation process different from the degree of resemblance calculation process shown in FIG. 14;

FIG. 21 is an illustration of kanji characters.

DESCRIPTION OF PREFERRED EMBODIMENTS

First Embodiment

Figure 1:
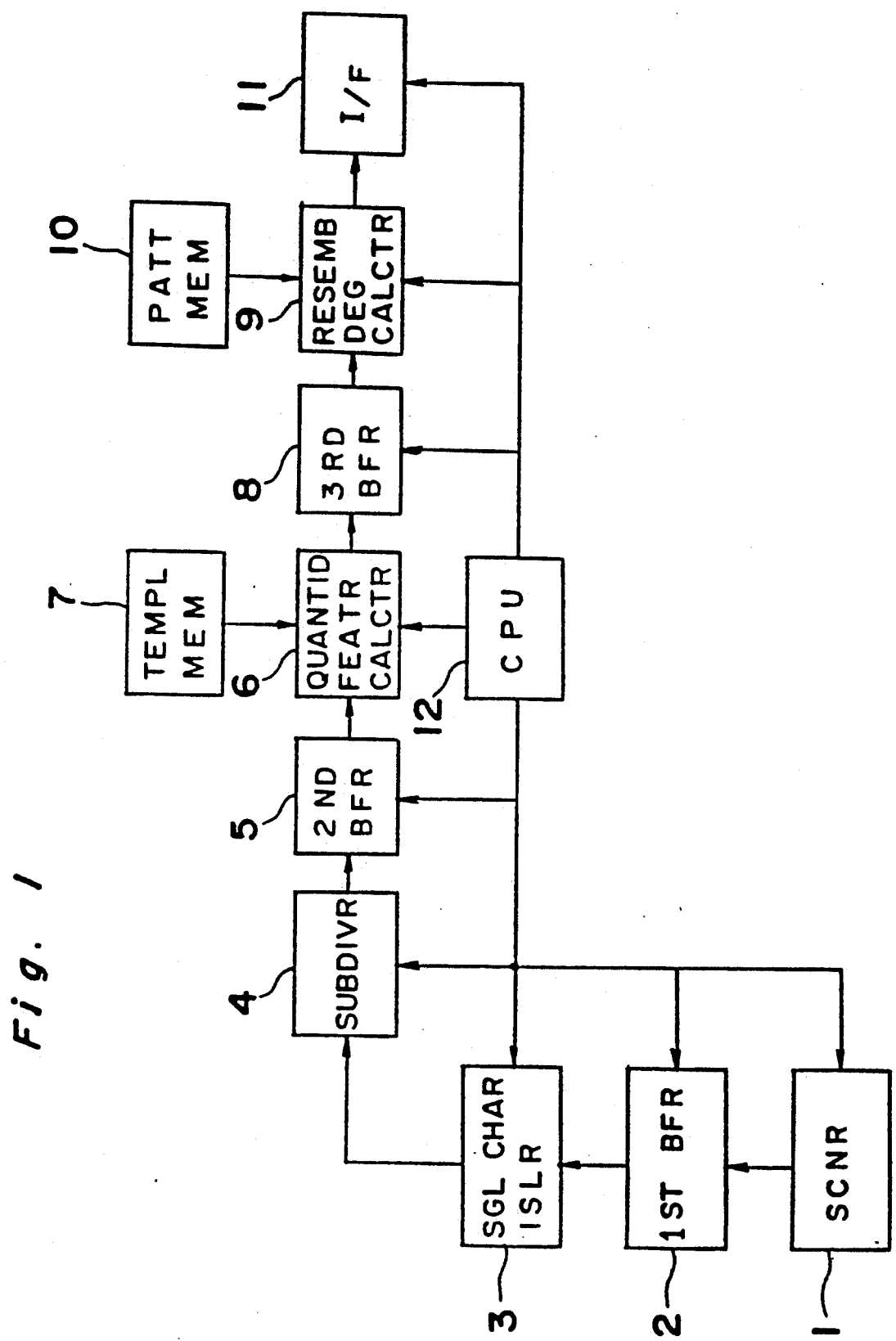
FIG. 1 is a block diagram of a first embodiment of a character recognition device according to the present invention.

A first embodiment of a character recognition device according to the present invention is shown in FIG. 1. This character recognition device is characterized by the ability to obtain a high character recognition rate independent of the recognition character group by obtaining quantified features which well express the differences in the character shapes of the recognition character group when the quantified features of the subregions composing the character image data for a single isolated character area are obtained.

Referring to FIG. 1, a scanner 1 reads character image data from a supplied text and temporarily stores the data in the first buffer 2. A single character isolator 3 scans the character image data stored in the first buffer 2 to isolate each single character area, and then outputs the character image data of the isolated single character areas to the subdivider 4. The subdivider 4 further divides the character image for the single character area isolated by the single character isolator 3 into subregions, and the image data for each of the resulting subregions is then temporarily stored in a second buffer 5.

The quantified feature calculator 6 sequentially scans the image data for each subregion stored in the second buffer 5 to calculate the degree of resemblance between the image data for the scanned subregion and plural templates corresponding to the subregion and stored in the template memory 7, as described later. A vector defined by the plural degrees of resemblance calculated for the one subregion is then temporarily stored in a third buffer 8 as the quantified features (features vector) of that subregion.

The degree of resemblance calculator 9 reads the quantified features for all subregions comprising the single character area from the third buffer 8 to obtain a feature pattern (a set of features vectors) for the single character. The degrees of resemblance between the feature pattern for the single character and plural standard patterns (sets of features vectors for the subregion in a corresponding standard character) stored in the pattern memory 10 are then calculated. The standard character patterns are obtained by the same process as described above from the image data for characters defined as the standard for comparison with the recognition characters.

The scanned character is thus recognized to be the character defined by the character code corresponding to the standard character pattern with the highest degree of resemblance (e.g., the inner product of both features vectors) between the feature pattern and the standard pattern as calculated by the degree of resemblance calculator 9. In other words, the degree of resemblance calculator 9 and the pattern memory 10 together form the character recognition member.

The character code thus recognized is then output from the interface 11 to an external device as the recognition result.

The CPU (central processing unit) 12 controls the scanner 1, first buffer 2, single character isolator 3, subdivider 4, second buffer 5, feature calculator 6, third buffer 8, degree of resemblance calculator 9, and interface 11, and executes the character recognition process as described hereinbelow.

Figure 2:
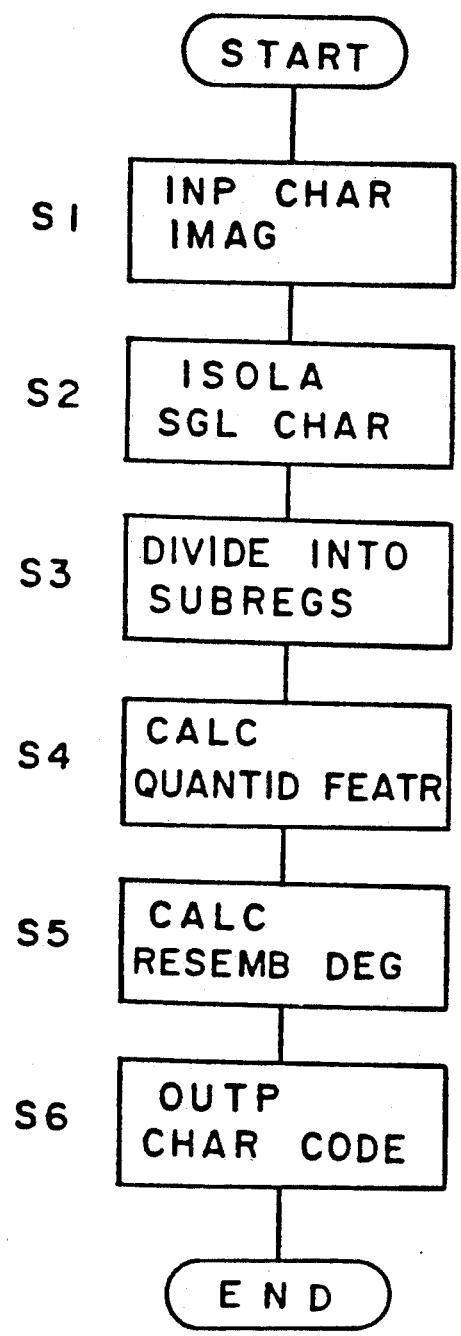
FIG. 2 is a flow chart of the single character recognition process executed in the CPU shown in FIG. 1.

FIG. 2 is a flow chart of the single character character recognition process executed by the CPU 12. The single character character recognition process employed by this first embodiment is described hereinbelow with reference to FIG. 2.

At step S1, the character image data is read from a provided text document by the scanner 1 and input as a character image.

At step S2, the character image data for a single character area is isolated by the single character isolator 3 based on the character image data read by the scanner 1.

At step S3, the character image data for a single character area isolated by the single character isolator 3 is divided into further subregions by the subdivider 4.

At step S4, the image data for each of the plural subregions constituting the single character area as divided by the subdivider 4 is read sequentially by each subregion by the feature calculator 6, and the degrees of resemblance to plural templates corresponding to that subregion and stored in the template memory 7 are calculated. The vector comprising plural degrees of resemblance associated with the compared templates is then defined as the quantified feature of that subregion.

Various methods can be employed for calculating the degrees of resemblance, including obtaining the Euclidean distance and taking the inverse of that value.

At step S5, the quantified features for all subregions constituting the single character area obtained in step S4 are read by the degree of resemblance calculator 9, which calculates the degrees of resemblance between the resulting single character feature pattern and plural standard patterns stored in the pattern memory 10.

At step S6, the character code corresponding to the standard character pattern with the highest degree of resemblance as calculated in step S5 is recognized as the character code corresponding to the character image for the single character area isolated in step S2. This recognized character code is output through the interface 11 to an external device, and the single character character recognition process is terminated.

This single character character recognition process is described hereinbelow in greater detail with reference to specific examples.

FIG. 3 is an example of the above process as applied to the recognition of the kanji character DAI (meaning "large", FIG. 3(a)) where DAI must be distinguished from the similar kanji character INU (meaning "dog", FIG. 3(b)). FIG. 3 (c) shows the template used when calculating the degree of resemblance for the subregions 21 and 21' in the top right corners of the 4-by-4 subregion matrices into which the characters in FIGS. 3 (a) and (b) are divided, respectively.

At step S4 in FIG. 2, the degree of resemblance calculation for subregions 21 and 21' in FIGS. 3 (a) and (b) is executed as follows. Specifically, the subregions 21 and 21' and the template are each further subdivided into, for example, a 16 element square matrix of four equal parts vertically and horizontally. It is then counted how many of the matrix elements for subregion 21 in FIG. 3 (a) and subregion 21' in FIG. 3 (b) match the 16 elements for each of the templates shown in FIG. 3 (c) (i.e., elements are determined to match if the average density in each element is on the same side of a predetermined threshold value). The obtained value is then defined as the degree of resemblance between the subregion 21 or 21' and each of the templates 1, 2, 3, and 4. Thus, if every element in the subregion matrix matches every element in the template matrix, the degree of resemblance between that subregion and the template is 16, and if there are no matching elements in the subregion and template matrices, the degree of resemblance is 0.

The degrees of resemblance between each of the templates 1, 2, 3, and 4 and the subregion 21 of the image for the character DAI shown in FIG. 3 (a), and the subregion 21' of the image for the character INU shown in FIG. 3 (b) are shown in Table 1.

TABLE 1

| Character/Template | 1 | 2 | 3 | 4 |
|---|---|---|---|---|
| DAI | 16 | 8 | 8 | 0 |
| INU | 10 | 8 | 14 | 6 |

The degrees of resemblance for all subregions other than subregions 21 and 21' are calculated in a like manner. The templates used for these calculations are different from those shown in FIG. 3 (c), being template groups corresponding to the subregion for which the degrees of resemblance are being calculated.

As will be known from Table 1, the degree of resemblance between the subregion 21 in the image for the character DAI and each of the templates other than template 2 (i.e., templates 1, 3, and 4) differs greatly from the corresponding degree of resemblance for the subregion 21' for the character INU. This is because templates 1, 3, and 4 well express the differences in character shape in the subregions 21 and 21' for the characters DAI and INU. Thus, in the character image DAI, the vector (16,8,8,0) formed by the degrees of resemblance in the character DAI is defined as the quantified feature of the subregion 21, and the vector (10,8,14,6) formed by the degrees of resemblance in the character INU is defined as the quantified feature of the subregion 21'.

Because each of the subregions in the images for the characters DAI and INU other than subregion 21 in the character DAI and subregion 21' in the character INU have approximately the same image data, the degree of resemblance between each subregion and the corresponding templates therefor will be the same. Therefore, the quantified features of each of the subregions other than subregion 21 and 21' will be the same. In other words, the difference in the shapes of the characters DAI and INU is well expressed by the difference in the quantified features of the subregions 21 and 21', and it is therefore easy to distinguish the character DAI from the character INU in a character group both DAI and INU.

As described hereinabove, by providing plural templates which well express the differences in image data for each character in the recognition character group for each of the possible subregions, quantified features which well express the features of the differences in character shapes, and not the features of the image data in each subregion, can be obtained. Therefore, by providing, for example, templates expressing the differences in character shapes for a character group composed of only hiragana, and different templates expressing the differences in character shapes for a character group composed of hiragana and JIS level-1 kanji for each subregion, quantified features which well express the differences in character shape for each character group according to the contents of the group as described above can be obtained.

Thus, if quantified features for the subregions are used as described according to the present embodiment, a high character recognition rate can be obtained both when a specific hiragana is recognized in a character group composed of only hiragana, and when the same hiragana is recognized in a character group composed of both hiragana and JIS level-1 kanji.

As described hereinabove with respect to a first embodiment of the present invention, character image data scanned by a scanner 1 and isolated into single character areas by a single character isolator 3 is further divided into plural subregions by a subdivider 4. Then, the degrees of resemblance between the subregion image data and plural templates corresponding to the subregion and stored in the template memory 7 are calculated for each subregion, and the resulting vector defined by the obtained plural degrees of resemblance is defined as the quantified features of that subregion. The degree of resemblance between the standard character pattern stored in the pattern memory 10 and the feature pattern for the scanned character formed by the quantified features for all subregions in the single character area calculated as thus described is then calculated by the degree of resemblance calculator 9, and the character code of the standard character pattern with the highest degree of resemblance is obtained as the character code of the scanned character.

Therefore, by providing plural templates according to the differences in the shapes of the characters in the recognition character group for each of the subregions, quantified features which well express for each subregion the differences in the shapes of the characters in the recognition character group can be obtained. In other words, according to the present embodiment, a high character recognition capability can be obtained for a variety of recognition character groups wherein the features of the differences in character shape differ for each group.

Second Embodiment

A second embodiment of the present invention relates to the method whereby the single character area is divided into subregions by the subdivider 4 shown in FIG. 1 with reference to the first embodiment.

Figure 6A:
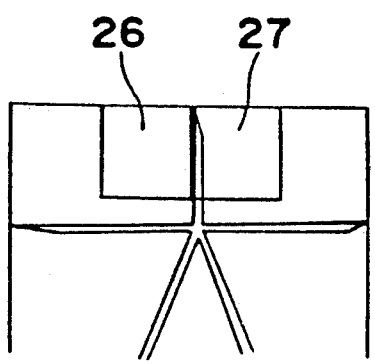
FIGS. 6a and 6b are a descriptive illustration of a conventional subregion dividing method.
Figure 6B:
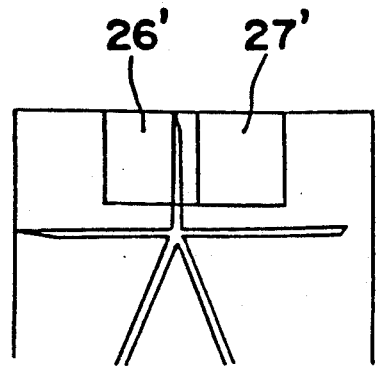

FIG. 6 shows an example of the conventional method whereby the single character area is divided into contiguous rectangular subregions of equal size. In this case the vertical line at the top center of the character DAI shown in FIG. 3 (a) occupies subregion 27 in FIG. 6 (a), and occupies subregion 26' in FIG. 6 (b). Therefore, if FIG. 6 (a) is the character image of the character being recognized and FIG. 6 (b) is the character image of the corresponding standard character pattern, then a high degree of resemblance between the feature pattern of the recognition character and the standard character pattern as calculated by the degree of resemblance calculator 9 in FIG. 1 will not be obtained. This problem is particularly frequent during character recognition of handwritten characters.

Figure 4:
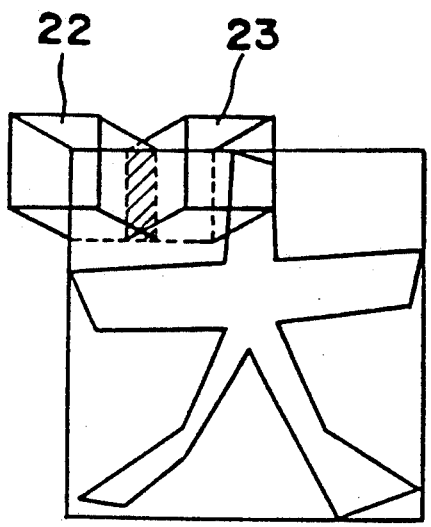
FIG. 4 is a descriptive illustration of a subregion dividing method.

Therefore, according to a second embodiment of the present invention, adjacent subregions (e.g., subregions 22 and 23) are generated so that they overlap by one-third as shown in FIG. 4. This provides the following effects.

Figure 5A:
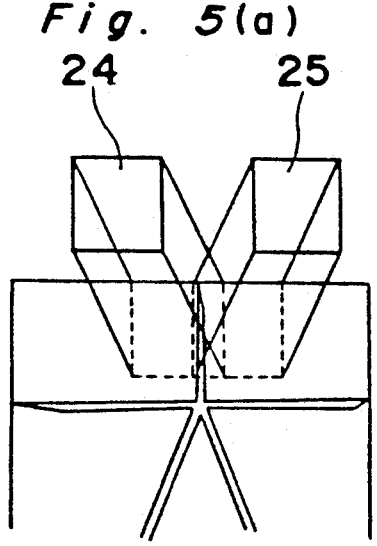
FIGS. 5a and 5b are a descriptive illustration of the effect of the subregion dividing method shown in FIG. 4.
Figure 5B:
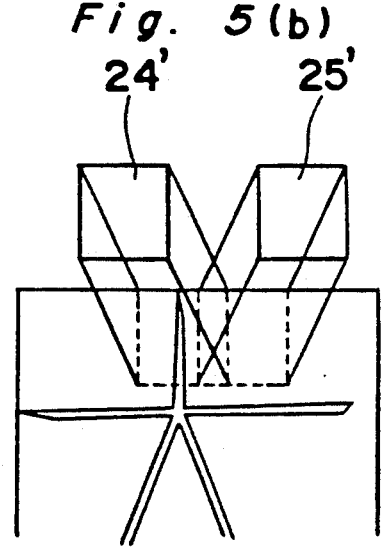

Specifically, the vertical line in the character DAI occupies subregion 24 in FIG. 5 (a), and occupies subregion 24' in FIG. 5 (b). As a result, a high degree of resemblance between the feature pattern of the recognition character and the standard character pattern is obtained by the degree of resemblance calculator 9 in FIG. 1.

Because the vertical line in the character DAI also occupies subregion 25 in FIG. 5 (a) but the same line is not found in subregion 25' in FIG. 5 (b) in this case, the degree of resemblance between subregions 25 and 25' is low. However, because the degree of resemblance is high between subregions 24 and 24', there is no problem overall with character recognition.

In the present invention as thus described, during the division of the single character area into subregions by the subdivider 4 in the first embodiment, the subregions are generated so that adjacent subregions overlap. Therefore, even in those cases in which the lines forming a character are found at the border area of adjacent subregions, the lines forming said character will be present in the corresponding subregions of the image data for the standard character pattern and the image data for the recognition character.

Therefore, a high degree of resemblance is obtained during calculation of the degree of resemblance for the feature pattern of the single character by the degree of resemblance calculator 9 in FIG. 1, and a high character recognition capability is therefore obtained.

While adjacent subregions overlap each other by one-third in this second embodiment, the invention shall not be so limited. Furthermore, while in the present embodiment as described hereinabove, adjacent subregions are generated to overlap in the horizontal direction, the same effect can be obtained if adjacent subregions are generated to overlap in the vertical direction.

Third Embodiment

A third embodiment of the present invention relates, as does the second embodiment described hereinabove, to the method of dividing the single character area into subregions.

In the first and second embodiments described hereinabove, each of the plural subregions into which the single character area is divided is of an equal size and shape. In this case, however, because the shape of each subregion is a uniform shape which does not make it possible to cover locations wherein the differences in the shape of the recognition character are well expressed, it is not possible to express the features of the differences in the shape of the recognition character by means of the quantified features obtained from only one to three subregions. It is therefore necessary to obtain the quantified features for every subregion forming the single character area, and generate a feature pattern for the single character area from the quantified features of all component subregions to express the features of the single character. In other words, the degree of resemblance calculation executed by the feature calculator 6 shown in FIG. 1 for the templates and the image data of the subregions must be executed for each of the sixteen subregions forming the single character area, thus lowering the efficiency of quantified feature calculation.

Figure 7:
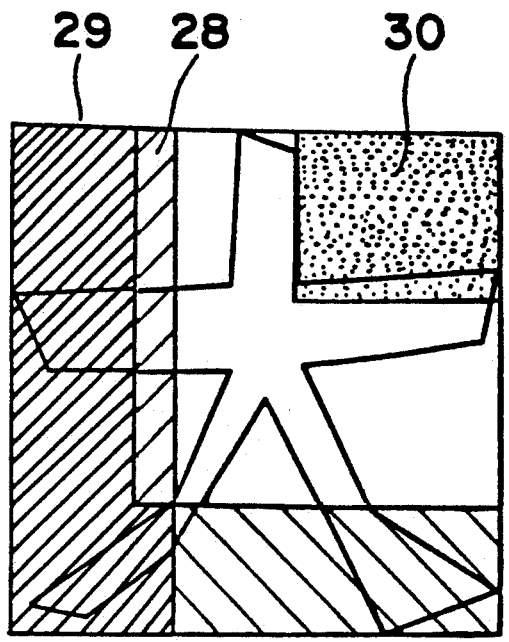
FIG. 7 is a descriptive illustration of a subregion dividing method different from that in FIG. 4.

Therefore, in a third embodiment of the present invention, the subregions into which the single character area is divided are variously shaped as shown in FIG. 7 to cover those parts of the character in which the differences in character shape are well expressed according to the character shapes of the recognition character group so that the quantified features calculation performed by the feature calculator 6 shown in FIG. 1 is more efficient and precise.

Figure 21:
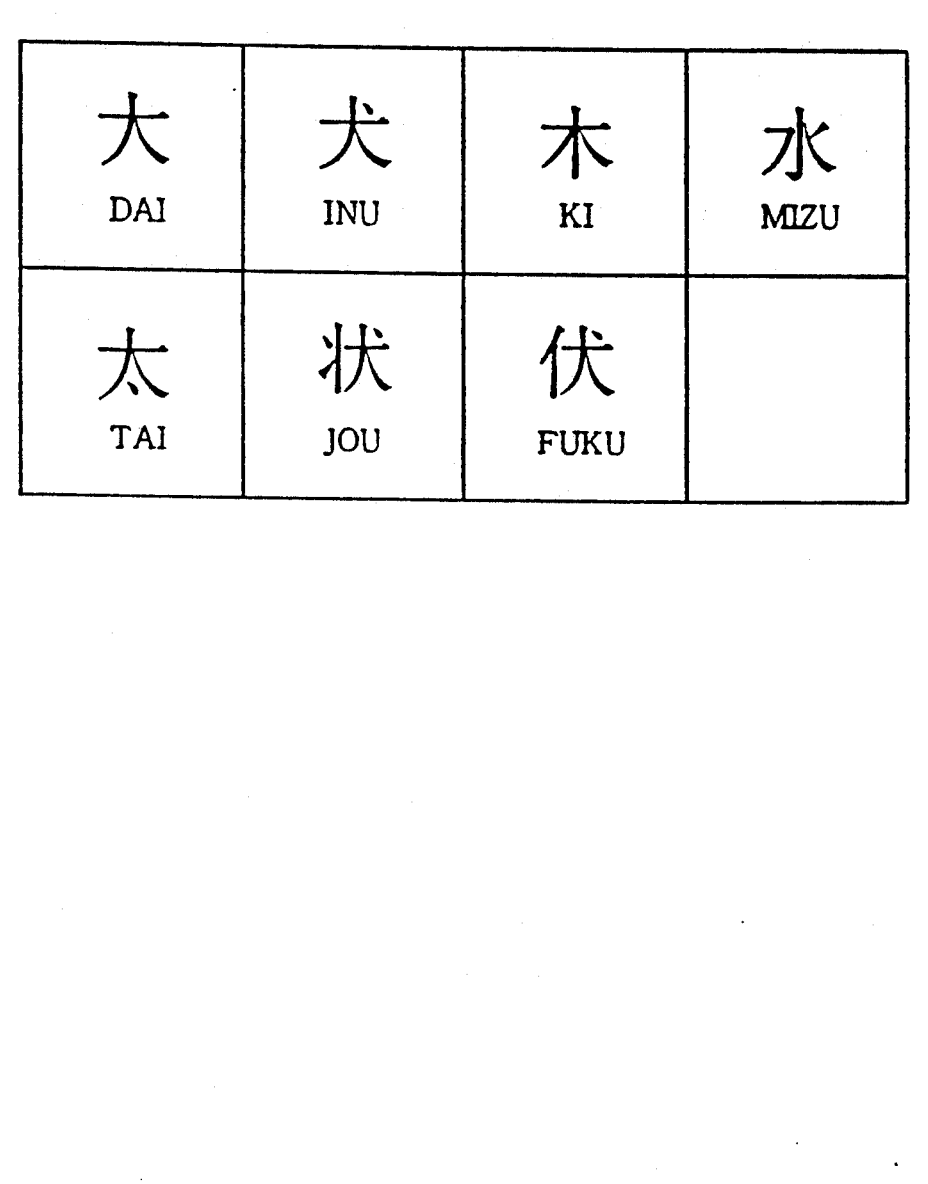

FIG. 7 is an example of the subregions used for recognition of the character DAI. The shapes of the subregions used with this character are defined so that similar characters, e.g., INU (dog), KI (tree), MIZU (water), TAI (fat), JOU (condition), FUKU (lay down) as shown in FIG. 21, can be easily distinguished. To achieve this, subregions 28, 29, and 30 are defined in the present embodiment.

The first subregion 28 is a simple rectangular vertical band at the left side of the single character area and expresses the difference in character shape in the left part of the single character area. This subregion 28 can therefore be used to easily distinguish the characters JOU and FUKU from the characters DAI, INU, KI, MIZU, and TAI in the above sample characters shown in FIG. 21. In addition, the subregion 29 is an L-shaped region comprising both a vertical and a horizontal rectangular component at the left and bottom sides, respectively, of the single character area, and expresses the difference in character shape in the left and bottom parts of the single character area, and is used to distinguish DAI and INU from KI, MISU, TAI, JOU, and FUKU. Finally, the third subregion 30 is a rectangle at the top right corner of the single character area which expresses the difference in character shape in this part of the single character area, and expresses the difference in character shape in the left part of the single character area and is therefore used to distinguish characters such as DAI and INU.

Templates corresponding to the first subregion 28 are therefore generated to well express the differences in the shape of the image in this subregion for character groups containing DAI, INU, KI, MIZU, TAI, JOU, FUKU, and similar characters. The templates for the other subregions 29 and 30 are likewise provided to well express the differences in character shape in the corresponding regions of the characters DAI, INU, KI, MIZU, TAI, JOU, FUKU, and similar characters.

In step S4 in FIG. 2, therefore, by calculating the degrees of resemblance between the subregions 28, 29 and 30 in a single character area with the corresponding templates provided therefor, the character code corresponding to the character image data for the input character DAI can be accurately distinguished from the character codes for the other characters in the character group including DAI, INU, KI, MIZU, TAI, JOU, FUKU, and similar characters.

As will be known from FIG. 7, it is sufficient if the subregions 28, 29, and 30 according to the present embodiment are formed to cover only parts essential to expressing the differences in the shape of the characters in the recognition character group, and the subregions therefore do not need to be formed to cover the entire single character area.

Thus, during the division of the single character area into subregions by the subdivider 4 in the first and second embodiments described hereinabove, the single character area is divided into subregions of various shapes whereby the differences in the shapes of the characters in the recognition character group are well expressed. Therefore, during quantified feature calculation, it is sufficient to calculate the degree of resemblance with the templates only for subregions whereby the differences in the shapes of the characters in the recognition character group are well expressed.

In other words, it is possible to calculate the quantified features which sufficiently express the differences in the shapes of the characters in the recognition character group during quantified feature calculation for a single character area. In addition, it is not necessary to calculate the degree of resemblance with templates for all subregions forming the single character area, and the quantified features of the subregions can be calculated with good efficiency and precision.

Fourth Embodiment

A fourth embodiment of the present invention relates to the generation of the templates used when calculating the degree of resemblance by the feature calculator 6 shown in FIG. 1. A neural network is used to automatically generate the templates in the present embodiment.

Figure 8:
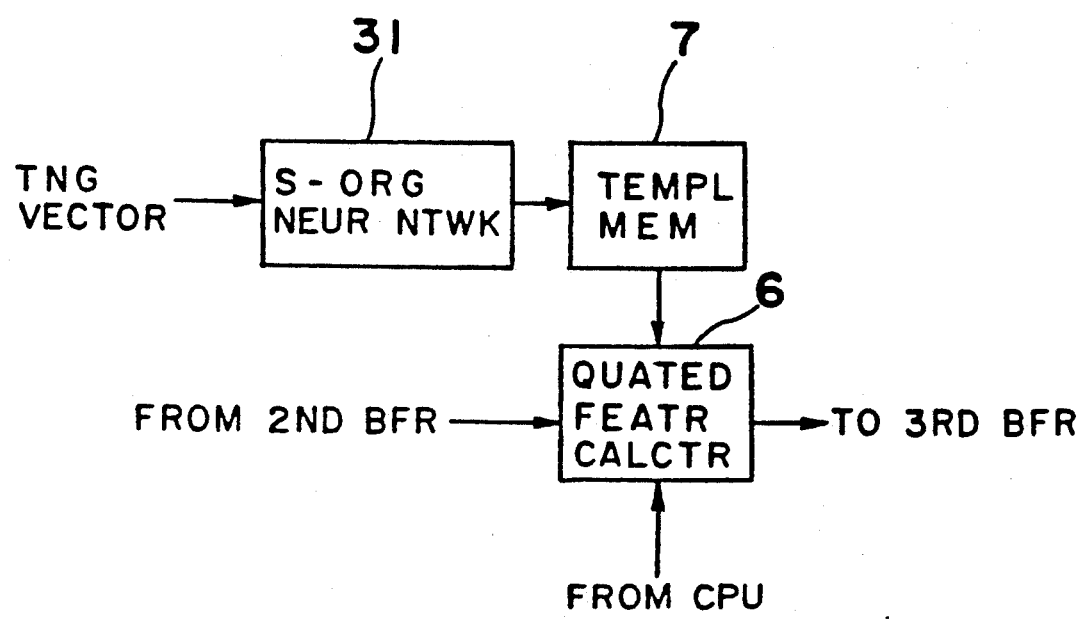
FIG. 8 is a partial block diagram of a character recognition device which generates templates by means of a self-organizing neural network.

FIG. 8 is a block diagram of a character recognition device according to a fourth embodiment of the present invention. The present embodiment relates to a self-organizing neural network 31 which is added to the character recognition device shown in FIG. 1 to generate the templates stored in the template memory 7 thereof. Shown in FIG. 8 are the feature calculator 6 and template memory 7 shown in FIG. 1, and the self-organizing neural network 31 added thereto; all other components are the same as those in FIG. 1, and are therefore omitted in FIG. 8.

Referring to FIG. 8, vectors expressing the image data corresponding to the subregions of the character image data in the characters representing the recognition character group are input as training vectors to the self-organizing neural network 31 before character recognition. Thus, the self-organizing neural network 31 is trained as will be described below so that the contents of a specific weight vector corresponding to the internal training vectors approach the contents of the input training vector. As the training vectors for the other subregions are sequentially input to the self-organizing neural network 31, the same training process is executed so that plural weight vectors mapping the training vectors are generated in the self-organizing neural network 31.

In other words, the content of the weight vectors generated in the trained self-organizing neural network 31 well express the image data of the subregions of the images of the characters representative of the recognition character group (hereinafter the "training characters"). The weight vectors in the fully trained self-organizing neural network 31 may therefore also be thought of as the templates used for degree of resemblance calculation in the subregions. Thus, the weight vectors generated in the self-organizing neural network 31 are stored in the template memory 7 with a specific subregion correspondence as templates used for calculating the degree of resemblance of the subregions of the individual character images.

When the character recognition process begins, the image area of each single character is divided into subregions, which are stored in the second buffer 5 shown in FIG. 1, as described with reference to the first embodiment. The subregion image data stored in the second buffer 5 and the templates corresponding to the subregions generated and stored in the template memory 7 as described above are then read by the feature calculator 6. The degree of resemblance between the templates and the subregion image data is then calculated by the feature calculator 6, resulting in quantified features for the subregion which are stored in the third buffer 8. The feature pattern for the single character is then obtained in the same manner as was described with reference to the first embodiment, and the degree of resemblance between the single character feature pattern and the standard character pattern is calculated.

Figure 9:
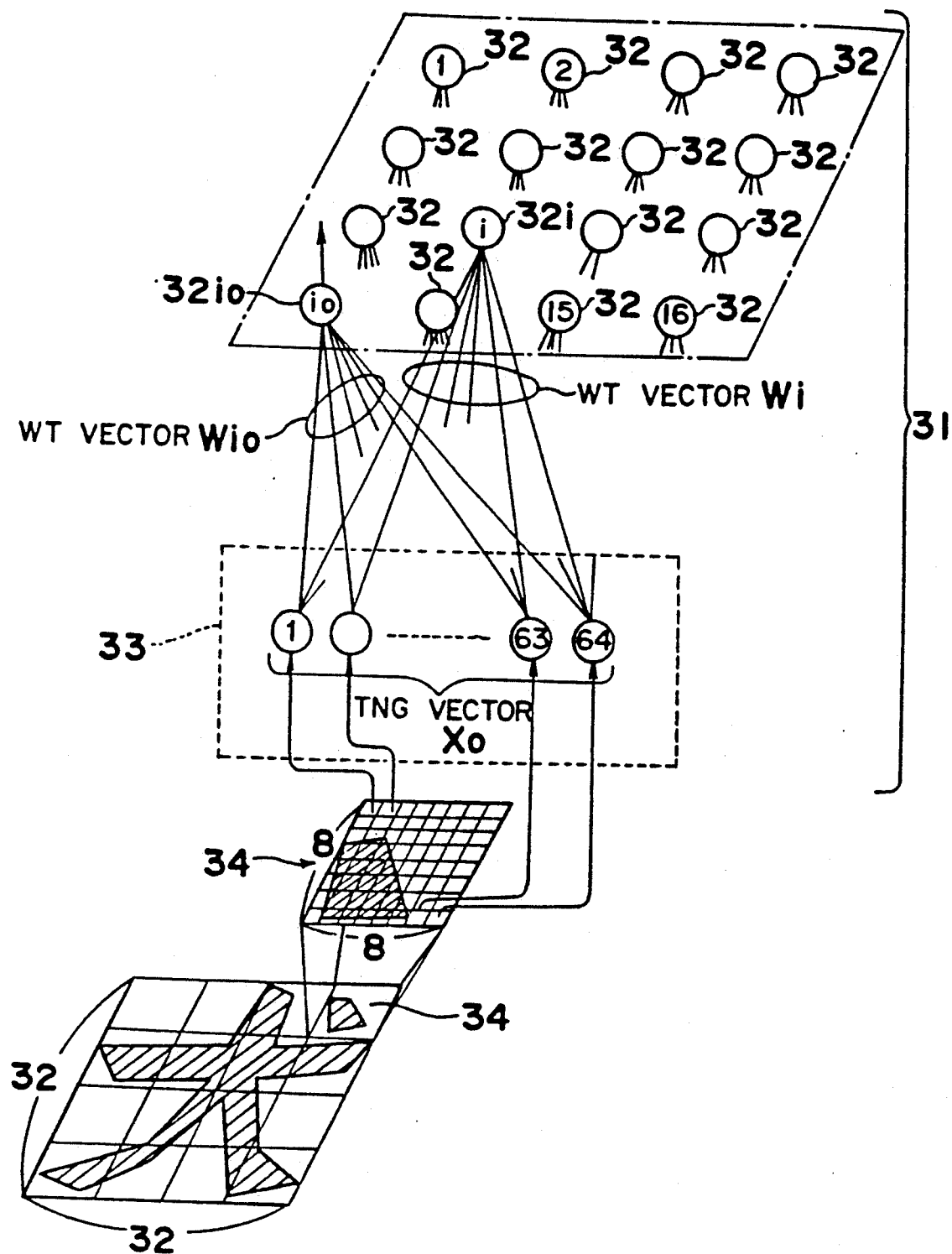
FIG. 9 is a descriptive illustration of the learning of the self-organizing neural network shown in FIG. 8.

FIG. 9 is a simplified illustration of the self-organizing neural network 31 according to the present embodiment. A Kohonen neural network which is trained by self-organizing feature mapping is used as the self-organizing neural network 31 in the present embodiment.

This Kohonen neural network is structured so that all self-organizing nodes 32 are coupled to the input node 33. The individual self-organizing nodes 32 are indicated by an "i" appended to the plural self-organizing nodes 32, e.g., self-organizing node 32i indicates the number [i] self-organizing node.

A 64 element training vector X expressing the image data in the subregions forming the single character area is input to the input node 33. Then, based on the training vector X and the weight vector W, the output value is calculated for each couple according to a defined algorithm. The weight vectors W are provided with a direct correspondence to the self-organizing nodes 32 such that the weight vector Wi corresponds to the self-organizing node 32i.

In the present embodiment the Kohonen neural network is trained by a process of self-organized feature mapping. By mapping the features of the contents of the training vector X input to the input node 33 to the contents of a specific weight vector Wi according to the training vector X, the weight vectors well expressing the image data of the subregions of the training characters representing the recognition character group are self organized.

This training by self-organized feature mapping is a training process applied to the weight vector W with the highest degree of resemblance to the input training vector X when the training vector X is input. Specifically, the training algorithm using this self-organized feature mapping process is a teacher-less training process executed by refreshing the value of the weight vector W according to equation (1).

When $$R\{X(t), Wc(t)\} = \max_i [R\{X(t), Wi(t)\}],$$

then for [i] where [i] is an element of Nc, $$Wi(t+1) = Wi(t) + a(t)(X(t) - Wi(t)) \quad (1)$$

For the other values [i], $$Wi(t+1) = Wi(t)$$

where
- t: number of training operations
- X: training vector
- W: weight vector
- i: number of the weight vector
- Wc: weight vector with the highest degree of resemblance to the training vector X
- R{A,B}: function to obtain the degree of resemblance between vector A and vector B
- a(t): a function the value of which decreased with the number of training operations (t)
- Nc: set of vector numbers in a specific area provided near Wc In other words, training by means of self-organized feature mapping refreshes the weight vector Wi (i being an element of Nc) present within a specific area near the weight vector Wc having the highest degree of resemblance to the training vector X so that the value of the difference (X−Wi) with the training vector X is decreased when the training vector X is input. By thus repeating the training process, the contents of the weight vector Wi gradually come to match the contents of the training vector X, and the features of the contents of the training vector X are mapped to the weight vector Wi. As a result, the self-organizing nodes 32 are self-organized.

Next, the use of the above training by self-organized feature mapping as applied to the generation of the templates used for degree of resemblance calculation with the subregions is described in detail below using by way of example that case in which the training vectors for the training character INU are input.

The outside boundaries of a character image read in by an image sensor with a 64×64 matrix construction are normalized to a constant size, and the character image data for the single character INU is obtained against a 32×32 mesh as shown in FIG. 9. In addition, this 32×32 mesh single character image data is further divided into 4×4 subregions 34. Each subregion is therefore an 8×8 mesh.

The operation whereby the image data for the top right subregion 34 resulting from the division of the image as described above is used to generate the training vector X0 is described next.

The image data in the 64 element mesh of the subregion 34 is input to the input node 33 as the elements of the 64 element training vector X0. Using the average density of the image data in each mesh element, a value of 1 is assigned to the image data when the average density of the mesh element exceeds a predetermined threshold value, and a value of 0 is assigned when the threshold is not exceeded. Thus, for each weight vector Wi corresponding to one self-organizing node 32i, the degree of resemblance R between the weight vector Wi and the training vector X0 is calculated.

The self-organizing neural network in the present embodiment has a simplified structure as described below. Specifically, this self-organizing neural network comprises sixteen groups of self-organizing nodes 32i, where each group contains sixteen self-organizing nodes, for a total of 256 self-organizing nodes 32i ($1 \leq i \leq 256$). Each of the sixteen self-organizing nodes 32 in each group is coupled to a different one input node, and each group has a direct correspondence to one of the subregions into which the single character area was divided. Only one group of self-organizing nodes, specifically the group corresponding to the top right subregion 34, is shown in FIG. 9. Therefore, the degree of resemblance calculation for this subregion 34 is performed using the weight vector Wi ($1 \leq i \leq 16$) corresponding to the single group, 16-element self-organizing node 32i ($1 \leq i \leq 16$) shown in FIG. 9. In other words, the degree of resemblance Ri is defined as R{X0,Wi} ($1 \leq i \leq 16$).

If the degree of resemblance with the weight vector Wi, the result of calculating degree of resemblance Ri, is the maximum possible value (i.e., Rmax=Ri0=R{X0,Wi0}), the contents of the weight vector Wi (where i is an element of Ni0) in the specified region centering on weight vector Wi0 are refreshed to approach the contents of the training vector X0. If the degree of resemblance Rmax becomes greater than the threshold as a result of repeating this training process, then training stops. Thus, the features of the training vectors X0 are mapped to the weight vector (e.g., weight vector Wi0) indicating the maximum degree of resemblance Rmax at this point.

In the same way the training vectors X1, X2 ... based on the image data for the same top right subregion (i.e., corresponding to subregion 34) in the other training characters are input sequentially to the input node 33. When training is then completed, the features of each of the the training vectors X1, X2 . . . are mapped to the weight vectors (e.g., weight vectors Wi1, Xi2 . . . ) showing the maximum degree of resemblance Rmax. In other words, the specific weight vectors Wi0, Wi1, Wi2, etc., corresponding to various training vectors including the training character INU are self-organized to map the image data in the top right subregion of each training character.

Thus, in the present embodiment, the contents of the weight vectors Wi0, Wi1, Wi2, etc., mapped to correspond to the training vectors X by this training process become templates for the corresponding subregion, specifically subregion 34 in the above example. Thus, templates which well express the differences in character shape in the corresponding subregion, the top right subregion 34 in this case, of the training character group are obtained.

Templates which well express the differences in character shape in the corresponding subregion in each of the training character groups are thus obtained by thereafter applying the same process described above to input the training vectors X for each of the other subregions (other than the top right subregion 34 used in the above example) for each of the training characters, including the character INU, to the input node of the corresponding group of self-organizing nodes (each different from the group, shown in FIG. 9, which corresponds to the top right subregion 34). By thus sequentially changing the subregion of the training character, including the character INU, and inputting the training vector X to the self-organizing neural network 31, templates which well express the differences in character shape in each subregion can be obtained for all subregions of each character in the training character group.

However, when calculating the degree of resemblance with the image data in the subregion using the resulting templates, the image data must be the image data obtained by dividing the 32×32 mesh of the image of the character being recognized into 4×4 subregions.

Thus, in the present embodiment, the templates stored in the template memory 7 in the first embodiment shown in FIG. 1 are generated based on the image data of the training character by a self-organizing neural network 31. Therefore, by training the self-organizing neural network 31 using training characters for each of the characters in the recognition group, templates which well express the differences in character shape in the corresponding subregion of each character in the recognition character group can be automatically obtained.

Furthermore, the number of self-organizing nodes 32 corresponding to one subregion forming the part of the single character area is sixteen in the present embodiment. However, the present invention shall not be so limited, and this number may be appropriately set to the number of templates to be used (specifically to the number of the types of training characters).

In addition, the above templates are generated by a self-organizing neural network 31 trained by self-organized feature mapping. However, the present invention shall not be so limited, and the same effect can be obtained by means of a Kohonen neural network trained by learning vector quantization (LVQ) or learning vector quantization 2 (LVQ2). What is essential is that the structure of the neural network and the learning algorithm enable the neural network to be trained such that the contents of the weight vectors approach the contents of the training vectors. However, because training by means of LVQ and LVQ2 are accomplished with a teacher, the neural network cannot be self organizing; thus, the trained vectors of the output node must be assigned to the corresponding category, and the training data must be entered, making training time-consuming. Therefore, training by means of self-organized feature mapping can be concluded to be a superior means of training because the templates can be automatically generated.

Fifth Embodiment

In a fifth embodiment of the present invention, the character code recognition process based on single character feature pattern comparison by the degree of resemblance calculator 9 and the pattern memory 10 in the fourth embodiment described hereinabove is accomplished by means of a neural network.

Figure 10:
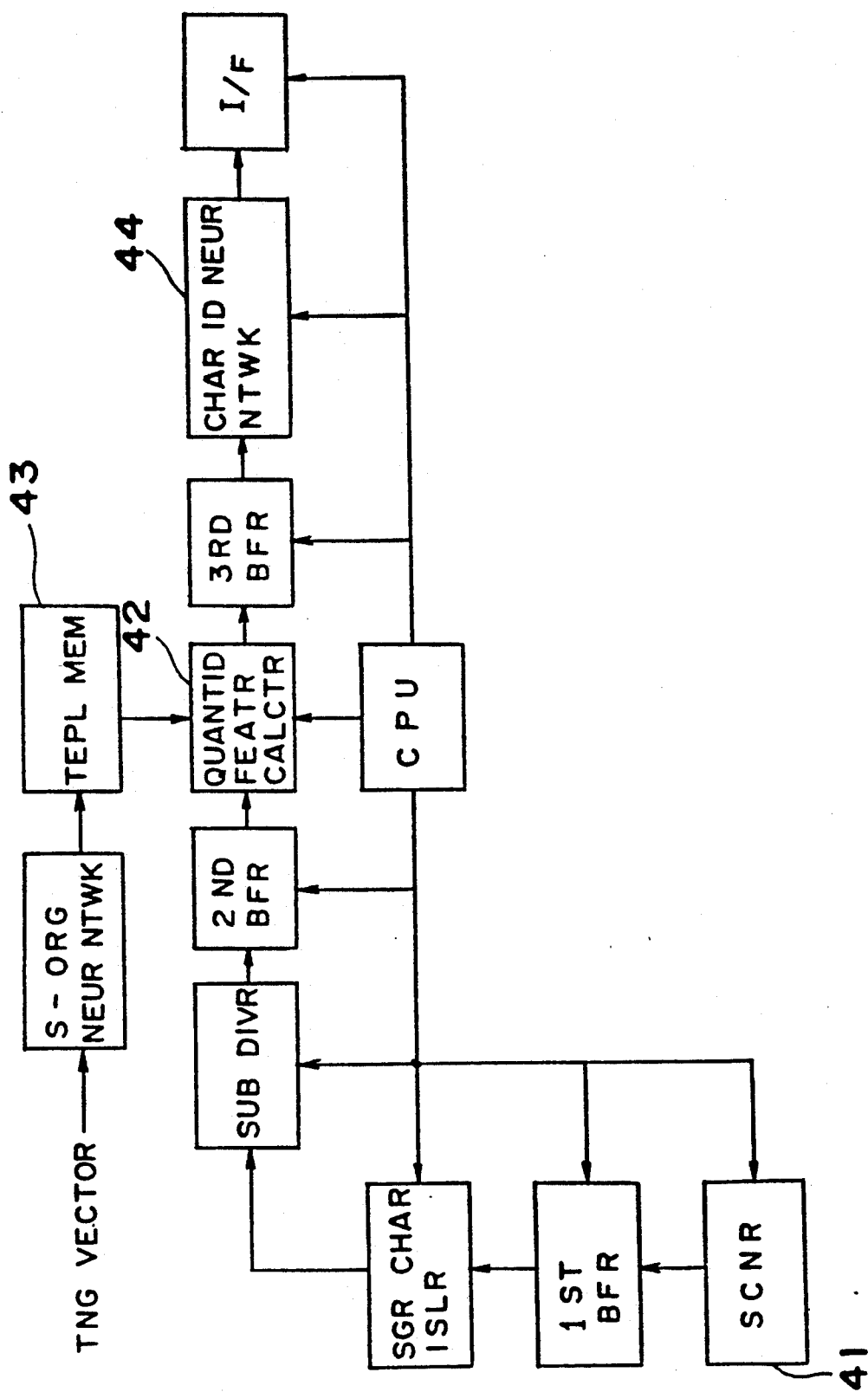
FIG. 10 is a block diagram of a character recognition device which executes the character code recognition process by means of a character recognition neural network.

FIG. 10 is a block diagram of a character recognition device according to the present embodiment. This embodiment comprises a character identification neural network 44 instead of the degree of resemblance calculator 9 and the pattern memory 10 in a character recognition device according to the fourth embodiment of the present invention. The character identification neural network 44 according to this embodiment uses a Kohonen neural network which is trained using learning vector quantization 2 (LVQ2). This alternative embodiment is described hereinbelow with reference to an application in the fourth embodiment described hereinabove.

Figure 11:
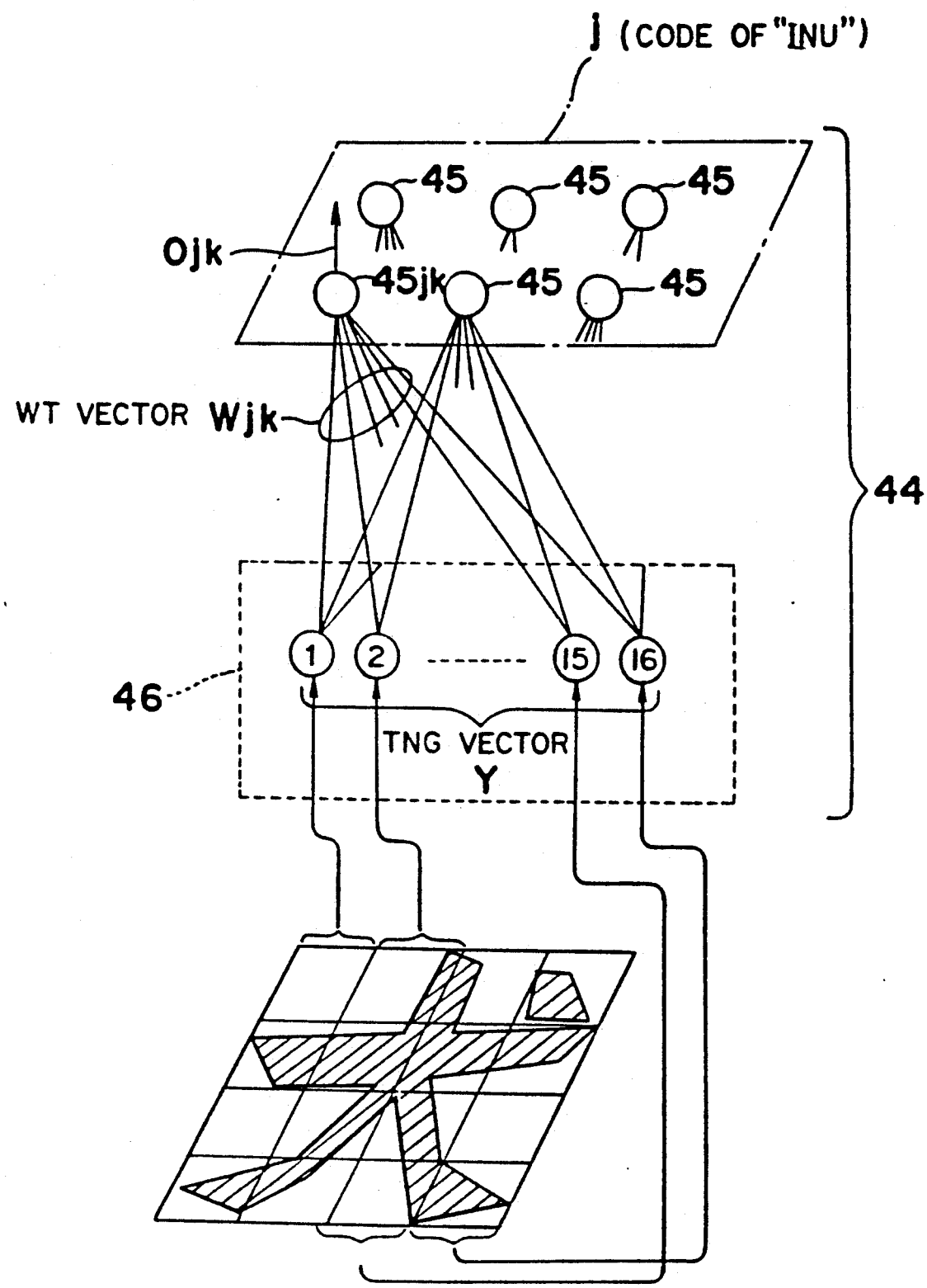
FIG. 11 is a descriptive illustration of the training of the character recognition neural network shown in the character recognition device shown in FIG. 10.

As shown in FIG. 11, the basic structure of this Kohonen-type neural network is one wherein all output nodes 45 are coupled to the input node 46. The output nodes 45 are assigned to the character code (category) of one of the characters in the recognition character group. It is assumed in the following description that the output nodes 45 are identified by the number [j] of the assigned character code and the number [k] of the plural output nodes 45 contained within that category. For example, output node 45jk is the number [k] output node assigned to the number [j] category. A 16 element input vector I corresponding to the subregions forming the part of the single character area is input to the input node 46. Then, based on the input vector I and the weight vector W, the output value O is calculated for each couple according to an algorithm as described below, and the computed output value O is output from each of the output nodes 45. Then, the category to which the output nodes 45 outputting the maximum value are assigned is identified as the category (character code) to which the input vector I belongs. It is here assumed that the weight vector W corresponds to the output nodes 45, and that each weight vector W is expressed by the same suffixed number as the corresponding output node (e.g., the weight vector W corresponding to output node 45jk is weight vector Wjk).

The algorithm used to calculate the output value Ojk in the Kohonen-type neural network as described above is shown in equation (2).

$$O_{jk} = \sum_{i=1}^{16} (i=1)(I_i \times W_{ijk}) \qquad (2)$$

where [i] is the number of input vector I and the element of the corresponding weight vector W ($1 \leq i \leq 16$).

The LVQ2 used as the training method of this Kohonen-type neural network is a method of refreshing the value of the weight vector W as defined by equation (3) described below according to the output value O when the training vector Y is input and the identification category based on that output value O.

The training vector Y is first generated as described next. Specifically, the character image data of the training character INU, which is normalized to a 32×32 mesh used for template generation, in the fourth embodiment described above is divided into subregions, each of which is an 8×8 mesh. The degrees of resemblance between the templates (64 element vectors), which are stored in the template memory 43 after being generated as described with reference to the fourth embodiment, and the image data (64 element vectors) in each subregion of the training character INU are calculated by the feature calculator 42.

This degree of resemblance may be, for example, the inner product of the vector of the image data for a given subregion and the vector of the template corresponding to that subregion. The degrees of resemblance between all templates corresponding to that subregion and the vector of the image data are similarly calculated, and the vector defined by the plural degrees of resemblance is defined as the quantified feature of that subregion. This operation is applied to all subregions (16) forming the single character area of the training character INU to obtain the quantified features of all subregions. The 16 quantified features obtained for the training character INU thus define the 16 element training vector Y associated with the training character INU.

The training vector Y thus obtained is then input to the input node 46 of the character identification neural network 44 shown in FIG. 11, and training of the neural network begins.

In other words, of the output values Ojk output from the output nodes when the training vector Y is input, the maximum output value is defined as $Oj1k1$, and the second highest output value is $Oj2k2$. Thus, if j1 does not equal the number of the category associated with training vector Y, and j2 equals the number of the category associated with training vector Y, the contents of weight vectors $Wj1k1$ and $Wj2k2$ are refreshed to:

$$\left. \begin{array}{l} Wj1k1 = Wj1k1 - K(Y - Wj1k1) \\ Wj2k2 = Wj2k2 + K(Y - Wj2k2) \end{array} \right\} \quad (3)$$

where K is a conslant or a function which is reduced with a number of training operations.

The initial value of the weight vectors $Wj1k1$ and $Wj2k2$ are the value of the training vector Y.

As a result, as training is repeated, the output value from the output node outputting the second highest output value $Oj2k2$ increases, and the the output value from the output node outputting the highest output value decreases. Then, the output value from the output node which output the second highest output value $Oj2k2$ belonging to the same category as the training vector Y becomes greater than the output value from the output node which output the highest output value $Oj1k1$ belonging to a category different from the training vector Y.

In other words, the output node assigned to the category j2 (the character code of the character INU) associated with the training vector Y comes to output the highest value, and it is thereby possible to correctly identify the category associated with the training vector Y based on the maximum output value.

The above process is repeated using the character image data for all of the other characters in the recognition character group to train the character identification neural network 44.

Thus, when training of the character identification neural network 44 is completed, the image data for the recognition characters are input to the scanner 41 and the character recognition process begins.

The character image data for a single character area in the recognition character group scanned by the scanner 41 is then divided into 8×8 mesh subregions. Then, the degrees of resemblance between the image data for all of the subregions forming the single character area and the templates stored in the template memory 43 are calculated by the feature calculator 42 as described above, for example. The quantified features of all subregions (16) forming the single character to be recognized is then obtained based on the results. The resulting 16 quantified features of the recognition character thus define the 16 element input vector I for the single recognition character.

When this 16-element input vector I is input to the input node 46 of the character identification neural network 44, the output value O is calculated for each couple according to equation (2) based on the input vector I and the weight vectors W refreshed by the training process described above, and the calculated output value O is output from each of the output nodes 45. The category (character code) to which the output node 45 outputting the highest value is assigned is thus identified as the character code of the recognition character, which is thus recognized.

In the present embodiment as described hereinabove, the character code recognition means, which recognizes the character codes of the recognition character based on the quantified features calculated by the feature calculator 42, is comprised of a character identification neural network 44 which is trained to identify the character code to which the input vectors based on the quantified features of all subregions forming the single character area are assigned. Therefore, it is not necessary to calculate the degree of resemblance between the feature pattern of the recognition character and the standard character pattern of the same character, and the character code of the recognition character can be efficiently recognized by means of a simple process of inputting to the character identification neural network 44 input vectors based on the quantified features of all subregions forming the single character area of the recognition character.

In the present embodiment a Kohonen-type neural network trained by a LVQ2 process is used as the character identification neural network 44, but the structure and training method of the character identification neural network in this invention shall not be so limited to that described hereinabove with reference to the present embodiment.

Furthermore, the character identification neural network forming the character code recognition means in the present embodiment was described hereinabove with reference to its application in the fourth embodiment of the present invention. This character identification neural network shall not be so limited, however, and may be applied with equivalent effect in the first, second, or third embodiment of the present invention or any combination thereof.

Sixth Embodiment

Figure 12:
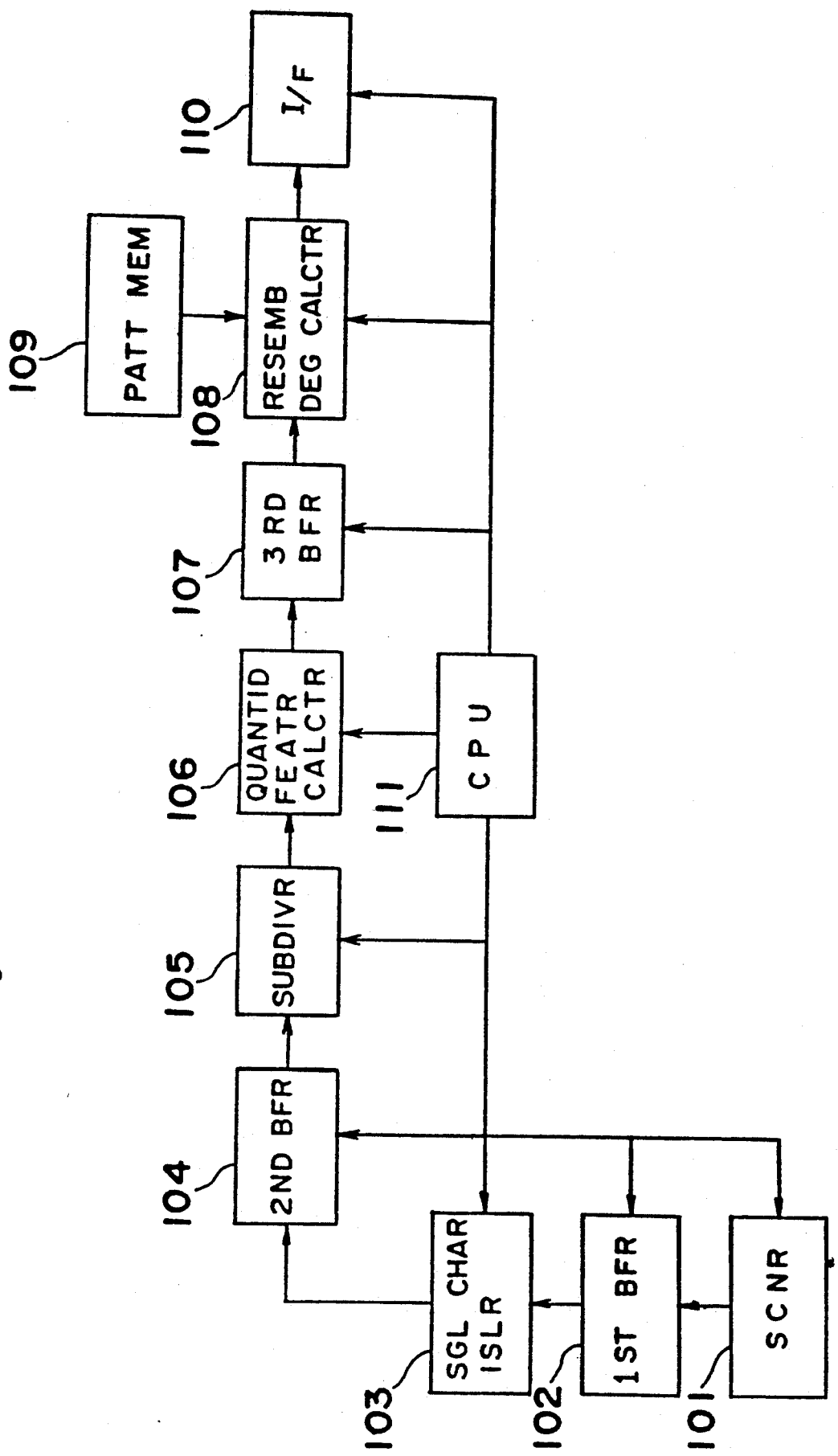
FIG. 12 is a block diagram of a character recognition device according to a sixth and seventh embodiment of the present invention.

FIG. 12 is a block diagram of a character recognition device according to a sixth embodiment of the present invention. In FIG. 12, the scanner 101 reads the character image data from the supplied text and temporarily stores the data in the first buffer 102. The single character isolator 103 reads out the character image data stored in the first buffer 102 to isolate each single character area, and then outputs the character image data of the isolated single character areas to a second buffer 104. The subdivider 105 further divides the character image for the single character area stored in the second buffer 104 into contiguous rectangular subregions, and the image data for each of the resulting subregions is then extracted and sent sequentially to a feature calculator 106.

The quantified feature calculator 106 sequentially reads the image data for each subregion sent from the subdivider 105 to calculate the quantified features of this subregion based on the image data of this single subregion. The quantified features calculated for that subregion are then temporarily stored at a specific address corresponding to the subregion in a third buffer 107. As a result, when the quantified features of all subregions constituting the single character area are calculated by the feature calculator 106, a feature pattern for the single character comprising the quantified features of the single character area is stored in the third buffer 107.

The method used to calculate the quantified features of each subregion in this process may be, for example, a mesh method.

The degree of resemblance calculator 108 calculates the degree of resemblance between the single character feature pattern stored in the third buffer 107 and various standard character patterns stored in a pattern memory 109. The degree of resemblance between the feature pattern and the standard pattern is calculated as follows.

Specifically, the quantified features of one subregion in the single character area of the feature pattern and the quantified features of the subregion in the single character area of the standard pattern are extracted, and the degree of resemblance between the two is calculated. This same process is used to extract the quantified features of the other subregions in the feature pattern and the quantified features of the other subregions in the standard pattern to calculate the degree of resemblance for each corresponding feature pair. Then, the sum of the degrees of resemblance of all subregions in the single character area is used as the degree of resemblance between the feature pattern and the standard character pattern. Note that the standard character pattern used in this calculation is the pattern of the quantified features obtained in the same manner from the character image data of the character used as the standard of comparison for character recognition.

In the same way, the degrees of resemblance are also obtained between the feature pattern and standard patterns other than the standard pattern used in the above description. The scanned character is thus recognized to be the character defined by the character code corresponding to the standard character pattern with the highest degree of resemblance between the feature pattern and the standard pattern as calculated by the degree of resemblance calculator 108.

The character code thus recognized is then output from the interface 110 to an external device as the recognition result.

The CPU (central processing unit) 111 controls the scanner 101, first buffer 102, single character isolator 103, second buffer 104, subdivider 105, feature calculator 106, third buffer 107, degree of resemblance calculator 108, and interface 110, and executes the character recognition process.

In other words, the degree of resemblance calculator 108 and the CPU 111 constitutes a degree of resemblance calculation means, subregion degree of resemblance determination means, degree of resemblance setting means, cost calculator, and degree of resemblance compensation means.

When there is a difference between the feature pattern based on the quantified features of the subregion forming the single character area of the recognition character generated by the single character isolator 103 and the standard pattern for the same character, the sixth embodiment of a character recognition device compensates for the shift in the feature pattern when calculating the degree of resemblance by the degree of resemblance calculator 108 to obtain the highest degree of resemblance.

The principle of this compensation is illustrated in FIG. 13 and FIG. 14.

FIG. 13 (a) shows the feature pattern of the single character "V" after being divided into subregions by the single character isolator 103 shown in FIG. 12, and FIG. 13 (b) shows the standard pattern for the same character "V" stored in the degree of resemblance calculator 109. Normally, the feature pattern and the standard pattern are a series of the quantified features calculated for each subregion by the feature calculator 106 shown in FIG. 12. To simplify the description herein, the contents of the subregion are shown in place of the image corresponding to the normal quantified features. As will be known from FIG. 13, because the standard pattern is generally obtained from a character image which will be the standard for that character (the character "V" in this example), the character shapes are normalized as shown in FIG. 13 (b) so that the standard pattern is completely contained in the single character area. However, because the feature pattern is generated based on a character image input by a scanner 101, it frequently occurs that the character shape does not perfectly fit the single character area, as shown in FIG. 13 (a), due to distortions introduced by copying an original text or from differences in handwriting.

Thus, as shown in FIG. 15, if the degree of resemblance is calculated between the quantified features of corresponding subregions in the feature pattern and the standard pattern in FIG. 13, i.e., between subregion 121 in FIG. 13 (a) and subregion 121' in FIG. 13 (b), the degree of resemblance will be, for example, 3 or a similarly low value. The same will be true of the other subregions. Thus, while the degree of resemblance between the feature pattern and the standard pattern of the same character "V" should normally be high, the resulting value is low.

To resolve this problem, when calculating the degree of resemblance between the quantified features of subregion 121 in FIG. 13 (a) and the quantified features of subregion 121' in FIG. 13 (b), the area from which the quantified features are extracted from the feature pattern is set as follows. Specifically, as shown in FIG. 14, the quantified features of three subregions related to the base subregion 121 are calculated, i.e., from a subregion 121a at the same position as the subregion 121 shown in FIG. 13 (a), subregion 121b offset a specific distance to the right from subregion 121a, and a subregion 121c similarly offset a specific distance to the left from subregion 121a. In the following description, the three subregions 121a, 121b, 121c related to the subregion 121 will be referred to as the related regions of subregion 121. When calculating the degree of resemblance, the degree of resemblance is calculated for the quantified features of the subregion 121' of the standard pattern and the quantified features extracted from each of the related regions 121a, 121b, 121c of the subregion 121 of the feature pattern. If as a result, as shown in FIG. 14, the values of the degree of resemblance between the quantified features of the subregions 121a, 121b, and 121c and the subregion 121' are Ra=3, Rb=10, and Rc=1, the highest value Rb=10 is selected as the degree of resemblance to the subregion 121 of the feature pattern.

The same process is followed thereinafter to sequentially calculate the degrees of resemblance between the quantified features of corresponding subregions in the standard pattern and the feature pattern of the recognition character.

Thus, any offset of the feature pattern to the standard pattern caused by a shift in the position of the input character image is compensated for when calculating the degree of resemblance between the feature pattern of a recognition character and the standard pattern of the same character. In other words, a degree of resemblance calculation process that can effectively handle shifts in the position of the input character image is achieved.

The above description used the recognition character "V" by way of example to describe the process of calculating the degree of resemblance for the standard pattern and the calculated feature pattern, but the same process is executed to calculate the degree of resemblance between the feature pattern and standard pattern of characters other than "V". It is to be noted, however, that the calculated degree of resemblance resulting therefrom will be lower than that described above.

Figure 16A:
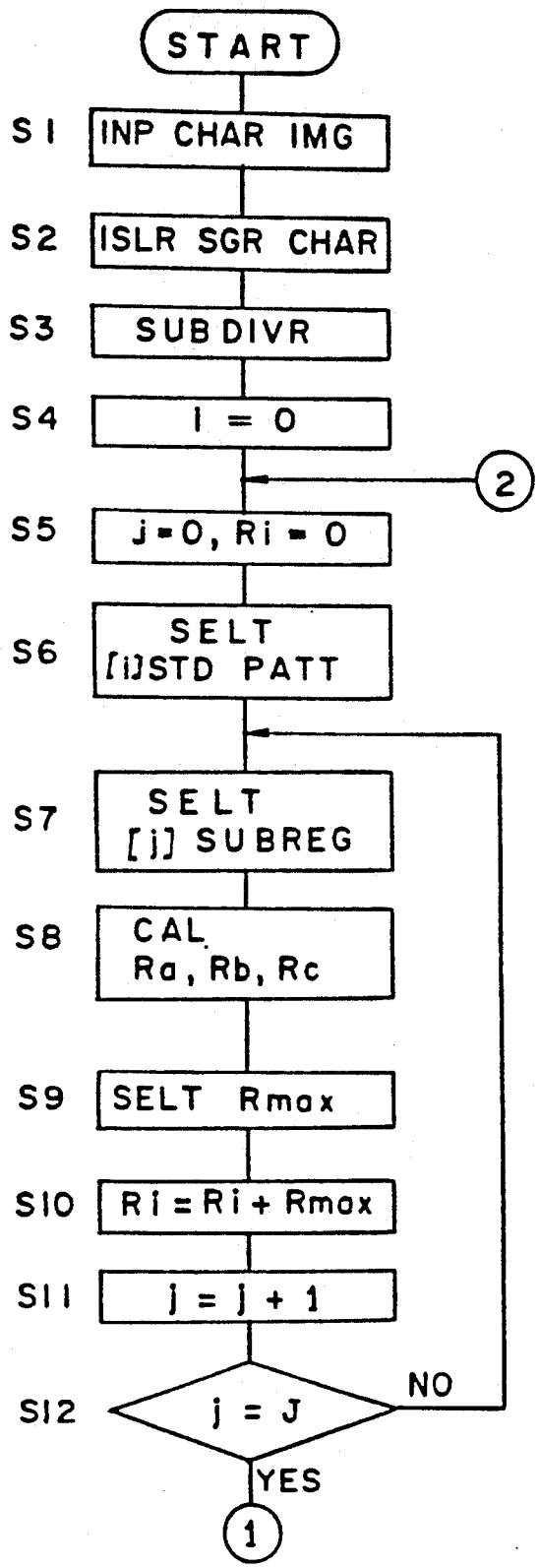
FIGS. 16 (a) and (b) are flow charts for the degree of resemblance calculation process shown in FIG. 14.
Figure 16B:
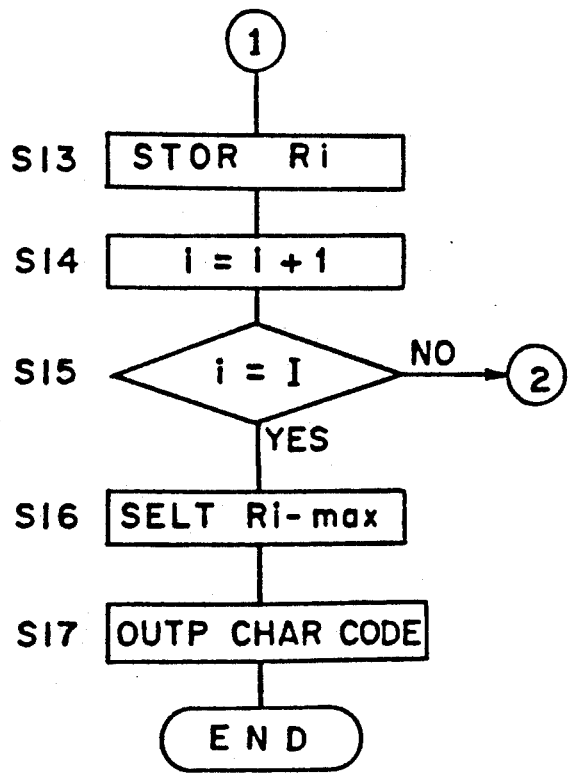

FIGS. 16 (a) and (b) is a flow chart of the single character character recognition process executed by the CPU 111. This single character character recognition process is described below with reference to FIGS. 16 (a) and (b).

At step S1, the character image data is read from a provided text document by the scanner 101 and input as a character image.

At step S2, the character image data for a single character area is isolated and stored in the second buffer 104.

At step S3, the character image data stored in the second buffer 104 is divided into further subregions. The quantified features of each subregion are calculated based on the image data for each of the subregions in the divided single character area, and stored in the third buffer 107. As a result, a feature pattern for the single character is generated from the quantified features for the single character area and stored in the third buffer 107.

At step S4, calculation of the degrees of resemblance between various standard patterns stored in the pattern memory 109 and the single character feature pattern stored in the third buffer 107 is started. At this step the standard pattern number [i] for the recognition character is initialized to 0.

At step S5, the subregion number [j] identifying the subregion for the current degree of resemblance calculation in the feature pattern and the number [i] standard pattern, and the degree of resemblance Ri associated with standard pattern [i] are set to 0.

At step S6, the number [i] standard pattern is selected from various standard patterns stored in the pattern memory 109.

At step S7, the number [j] subregion is selected in the feature pattern and in the [i] standard pattern selected in step S6.

At step S8, the quantified features of the three related regions of the [j] subregion in the feature pattern are extracted from the third buffer 107, and the quantified features of the [j] subregion in the [i] standard pattern selected in step S6 are extracted from the pattern memory 109. The degrees of resemblance Ra, Rb, and Rc are then calculated for the quantified features of the three related regions of the feature pattern and the quantified features of the corresponding subregion in the standard pattern.

At step S9, the maximum (Rmax=Rb in the example shown in FIG. 13) of the three degrees of resemblance Ra, Rb, and Rc calculated in step S8 is selected.

At step S10, the maximum value Rmax of the three degrees of resemblance Ra, Rb, and Rc selected in step S8 is set as the degree of resemblance between the [j] subregion in the feature pattern and the [j] subregion in the [i] standard pattern, and the degree of resemblance Rmax is added to the current degree of resemblance Ri (the sum of the degrees of resemblance for the subregions from 1 to j−1) of the [i] standard pattern.

At step S11, the subregion counter j is incremented.

At step S12, it is determined whether the subregion number j is equal to the maximum number of subregions J comprising the single character area (in FIG. 13, J=9). If j=J, the procedure advances to step S13; if j does not equal J, the procedure loops back to step S7, and the degree of resemblance is calculated for the next subregion.

At step S13, the degree of resemblance Ri between the feature pattern and the [i] standard pattern is stored in the internal memory (not shown in the figures) of the degree of resemblance calculator 108.

At step S14, the standard pattern number [i] is incremented.

At step S15, it is determined whether the standard pattern number [i] is equal to the maximum number of standard patterns [I] stored in the pattern memory 109. If i=I, the procedure advances to step S16, and if i does not equal I, the procedure loops back to step S5 so that the degree of resemblance with the standard pattern at the next standard pattern address is calculated.

At step S16, the maximum (Ri-max) of degrees of resemblance Ri ($1 \leq i \leq I$) of all standard patterns stored in the internal memory is selected.

At step S17, the character code corresponding to the standard pattern corresponding to the Ri-max value selected in step S16 is identified as the character code corresponding to the image of the single character area isolated in step S2. This character code is then output from the interface 110 to an external device, and the single character character recognition process is completed.

In the present embodiment as thus described, the character image data for a single character isolated by the single character isolator 103 from data scanned in by the scanner 101 is divided into plural subregions by the subdivider 105. The quantified features of each subregion are then calculated based on the image data of that subregion by the feature calculator 106. The degree of resemblance between the feature pattern of the recognition character defined by the quantified features thus calculated for all subregions forming the single character area and the standard pattern stored in the pattern memory 109 is then calculated by the degree of resemblance calculator 108, and the character code of the standard pattern with the highest degree of resemblance is recognized as the character code of the recognition character.

The degree of resemblance calculation executed by the degree of resemblance calculator 108 for the feature pattern of the recognition character and the standard pattern is applied to the quantified features extracted for the subregions in the corresponding parts of the feature pattern and the standard pattern, and the sum of the degrees of resemblance for all subregions in the single character area is used as the degree of resemblance between the feature pattern and the currently selected standard pattern. Furthermore, during the degree of resemblance calculation of corresponding subregions in the feature pattern and the standard pattern, the quantified features of the related regions of each subregion in the feature pattern and the corresponding subregion in the standard pattern are extracted, the degrees of resemblance between the quantified features of each of the related regions of each subregion in the feature pattern and the corresponding subregion in the standard pattern are calculated, and the highest degree of resemblance for the related regions is used as the degree of resemblance between the corresponding subregions in the feature pattern and the standard pattern.

Therefore, it is possible to compensate for any offset to the standard pattern due to the position of the input character image when calculating the degree of resemblance between the feature pattern of the recognition character and the standard pattern for the same character. Specifically, according to the present embodiment, a high degree of resemblance can be obtained in the degree of resemblance calculation with the feature pattern of the recognition character and the standard pattern of the same character, and a high character recognition rate is obtained as a result.

It is to be noted that while the number of subregions in a single character area in the sixth embodiment as described hereinabove was nine, the present invention shall, of course, not be so limited.

Furthermore, the related regions of a given subregion used for degree of resemblance calculation in the feature pattern are defined as three regions offset by a predetermined amount to the right and left sides of the base region. However, the present invention shall not be so limited, and the same effect can be obtained using, for example, four or more plural related regions offset to the right and left sides of the base region thereof. In this case, it is also possible to process characters wherein the feature pattern thereof is distorted with respect to the standard pattern corresponding thereto (specifically, when the offset of the image differs within each subregion of the single character area).

Seventh Embodiment

A seventh embodiment of the present invention is illustrated by the block diagram in FIG. 12, which also illustrates the sixth embodiment described above.

The seventh embodiment of the present invention obtains a higher character recognition rate by introducing the results of degree of resemblance calculation to the subregions adjacent to the subregion for which the degree of resemblance was calculated. This result is introduced when calculating by means of the degree of resemblance calculator 108 shown in FIG. 12 the degree of resemblance in corresponding subregions in the feature pattern of the recognition character and the standard pattern corresponding thereto.

Figure 18:
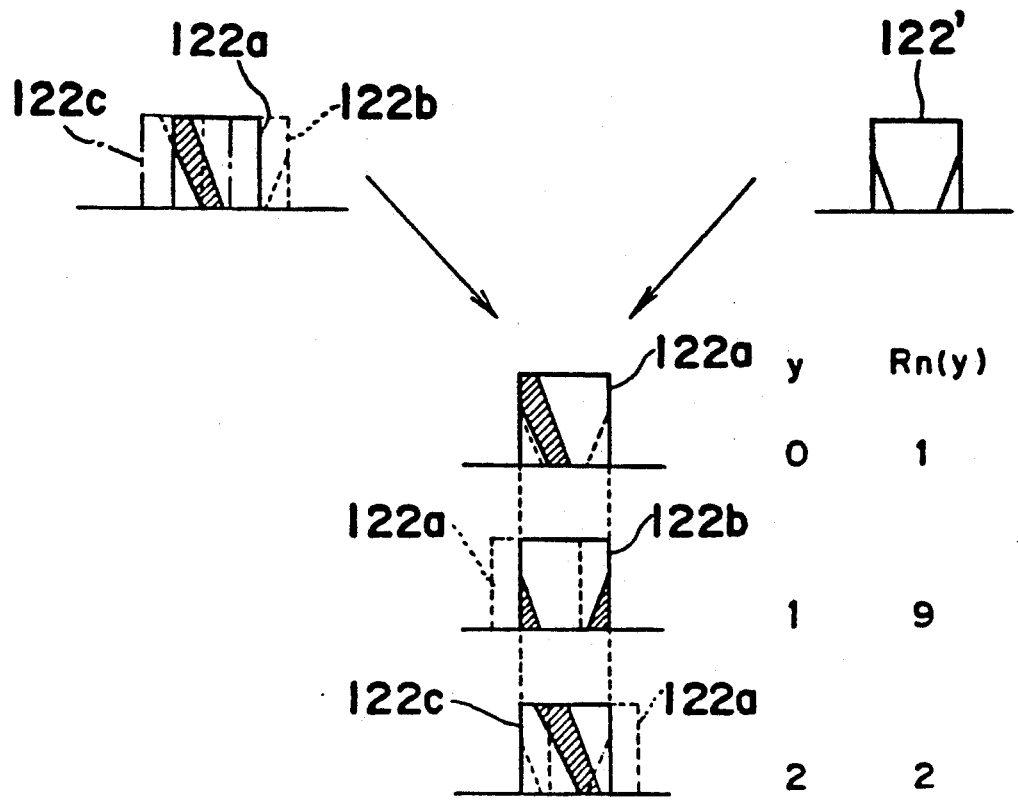
FIG. 18 is a descriptive illustration of a degree of resemblance calculation process as it relates to an adjacent region in FIG. 17.

The principle whereby this seventh embodiment operates is illustrated in FIG. 17 and FIG. 18.

FIG. 17 (a) shows a simulation of the feature pattern of the same character "V" shown in FIG. 13 (a), and FIG. 17 (b) shows a simulation of the standard pattern for the same character "V" shown in FIG. 13 (b).

FIG. 18 is a descriptive drawing of the degree of resemblance calculation for the subregion 122 in the feature pattern in FIG. 17 (a) and the subregion 122' corresponding to subregion 122 in the standard pattern in FIG. 17 (b). The degree of resemblance between the subregions 122 and 122' in the feature pattern and the standard pattern, respectively, is calculated by the same method as described with the sixth embodiment above. Specifically, the quantified features of the feature pattern used for degree of resemblance calculation are extracted for the three related regions 122a, 122b, and 122c where related region 122a is the region at the same position as the subregion 122 shown in FIG. 17 (a), region 122b is the region shifted a predetermined distance to the right from the region 122a, and region 122c is the region shifted a predetermined distance to the left from the region 122a. Then, as a result of calculating the degree of resemblance between the quantified features extracted from the related regions 122a, 122b, and 122c of the feature pattern subregion 122 shown in FIG. 17 (a) and the quantified features extracted from the corresponding subregion 122' in the standard pattern shown in FIG. 17 (b), the value of the degree of resemblance with region 122a is 1, that with region 122b is 9, and that with region 122c is 2.

The calculation of the degree of resemblance between the subregion 123 in the feature pattern in FIG. 17 (a) and the corresponding subregion 123' in the standard pattern in FIG. 17 (b) is described next.

In this degree of resemblance calculation method, the subregions 122 and 122' are considered near subregions, and the above subregions 123 and 123' are the object subregions for which the degree of resemblance is to be calculated. Prior to calculating the degree of resemblance between the subregions 123 and 123' in the feature pattern and the standard pattern, respectively, the cost associated with the object subregion 123 in the feature pattern is first calculated from the degree of resemblance between the subregions 122 and 122', which are near subregions in the feature and standard patterns, respectively. Then, based on this cost, the direction of the offset of the object subregion 123 in the feature pattern is set to agree with the direction of the offset of the near subregion 122.

Figure 19:
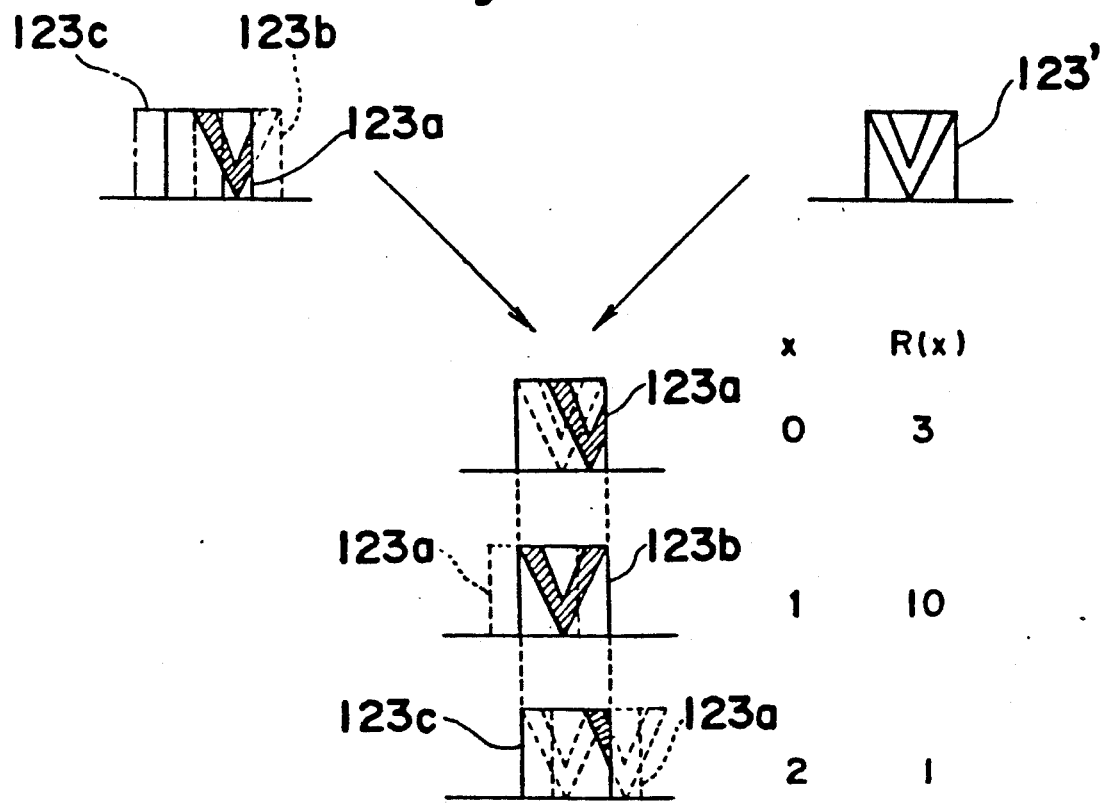
FIG. 19 is a descriptive illustration of a degree of resemblance calculation process as it relates to a target region in FIG. 17.

As shown in FIG. 19, by applying the same calculation method used in the sixth embodiment described hereinabove, the degree of resemblance between the object region 123 in the feature pattern and the corresponding object region 123' in the standard pattern is calculated. At this time, the degrees of resemblance with the three related regions 123a, 123b, and 123c based on the object region 123 in the feature pattern are 3, 10, and 1, respectively.

At this point, a number is assigned as shown below in Table 2 to each of the related regions in the object region or the near region of the feature pattern when calculating the degree of resemblance between the object region or the near region in the feature pattern and the corresponding object region or near region in the standard pattern.

TABLE 2

| Related region number | Direction of offset | orresponding Regions |
| --- | --- | --- |
| 0 | None | Regions 122a, 123a |
| 1 | To right | Regions 122b, 123b |
| 2 | To left | Regions 122c, 123c |

At this time, the variable expressing the related region number in the object region is [x], and the variable expressing the the related region number in the near region is [y]. These related region numbers are shown in FIGS. 18 and 19 by way of example.

This cost is calculated by weighting the degree of resemblance between the related regions of the near regions in the feature pattern and the corresponding near regions in the standard pattern using equation (4).

$$C(x) = \sum_{y=0}^{2} \{Rn(y) \times W(x,y)\} \quad (4)$$

where

C(x): the cost associated with the [x] related region in the object region

Rn(y): degree of resemblance associated with the [y] related region in the near region W(x,y): element in a weight matrix for calculating the cost associated with the related regions in the object region from the degree of resemblance associated with each related region in the near region.

The weight matrix W(x,y) is preset as described below with reference to Table 3 according to the related region number [x] associated with the object region and the related region number [y] associated with the near region, and is stored in the internal memory of the degree of resemblance calculator 108.

TABLE 3

| x | y | | |
| --- | --- | --- | --- |
|  | 0 | 1 | 2 |
| 0 | −0.1 | 0.1 | 0.1 |
| 1 | 0.1 | −0.1 | 0.2 |
| 2 | 0.1 | 0.2 | −0.1 |

The weight matrix W(x,y) shown in Table 3 applies a negative value (−0.1) when the direction of offset of the feature pattern to the standard pattern is the same in the object region and the near region (i.e., when x=y), and applies a large positive value (0.2) when both are offset in the opposite direction (i.e., when x=1 and y=2, or x=2 and y=1).

Therefore, the value of the cost C(x) associated with each related region in the object region calculated according to equation (4) is a small value (normally a negative value when calculated for the standard pattern and the feature pattern of the same character) when the cost is associated with the related regions in an object region which has the same related region number as the related region number of the related region showing a large degree of resemblance in the near region. On the other hand, when the cost is associated with the related regions in an object region which has the same related region number as the related region number of the related region showing a small degree of resemblance in the near region, the cost is a high value.

Next, the degree of resemblance between the subregion 123 in the feature pattern and the corresponding subregion 123′ in the standard pattern is calculated by applying in equation (5) the cost C(x) calculated according to equation (4). In this case, the degree of resemblance calculated from equation (5) and associated with the present invention differs from the degree of resemblance R (e.g., a value taken from the inverse of the Euclidean distance) obtained from conventional methods using equation (4) and used in the sixth embodiment described hereinabove, and is therefore designated degree of resemblance NR in the following description to distinguish it from the conventional degree of resemblance R used hereinabove.

$$NR = \max_{x} \{R(x) - C(x)\} \quad (5)$$

where R(x): the degree of resemblance associated with related region of number [x] in the object region The value of the degree of resemblance NR in the object region of the feature and standard patterns calculated according to equation (5) is calculated by correcting by means of the cost C(x) obtained from equation (4) the degree of resemblance R(x) of the object region in the standard pattern and each of the related regions in the object region of the feature pattern. At this time, the cost C(x) is related to the feature and standard patterns, and is a negative value when the cost is associated with the related regions in an object region which has the same related region number as the related region number of the related region showing a large degree of resemblance in the near region. Thus, for the feature and standard patterns of the same character, the value of the degree of resemblance NR in the object region is corrected to increase the degree of resemblance associated with the related regions in an object region which has the same related region number as the related region number of the related region showing a large degree of resemblance in the near region. On the other hand, the value of the degree of resemblance NR in the object region is corrected to decrease the degree of resemblance associated with the related regions in an object region which has the same related region number as the related region number of the related region showing a small degree of resemblance in the near region. Thus, the direction in which the object region of the feature pattern is offset with respect to the object region in the standard pattern is corrected to match the direction in which the near region of the feature pattern is offset with respect to the near region in the standard pattern.

The calculation of the degree of resemblance NR between the object region 123 in the feature pattern and the corresponding object region 123′ in the standard pattern is described more specifically below using by way of example the degree of resemblance Rn(y) between the related regions in the near region of the feature pattern for the recognition character "V" and the corresponding near region in the standard pattern as shown in FIG. 18, the degree of resemblance R(x) between the related regions in the object region of the feature pattern shown in FIG. 19 and the corresponding object region in the standard pattern, and the weight matrix W(x,y) shown in Table 3.

In FIG. 18, the degree of resemblance Rn(y) is calculated between each of the related regions 122a, 122b, and 122c for the near region 122 in the feature pattern and the near region 122' in the standard pattern as described below based on the sixth embodiment described hereinabove.

Rn(0)=1 related region 122a (no offset)
Rn(1)=9 related region 122b (right offset)
Rn(2)=2 related region 122c (left offset)

Thus, the cost C(x) for each related region is calculated as shown below according to equation (4) using the weight matrix W(x,y) corresponding to the value of the degree of resemblance Rn(y).

$$C(0) = Rn(0) \times W(0,0) + Rn(1) \times W(0,1) + Rn(2) \times W(0,2)$$
$$= 1 \times (-0.1) + 9 \times 0.1 + 2 \times 0.1$$
$$= 1.0$$

$$C(1) = Rn(0) \times W(1,0) + Rn(1) \times W(1,1) + Rn(2) \times W(1,2)$$
$$= -0.4$$

$$C(2) = Rn(0) \times W(2,0) + Rn(1) \times W(2,1) + Rn(2) \times W(2,2)$$
$$= 1.7$$

In FIG. 19, the degree of resemblance R(x) is calculated between each of the related regions 123a, 123b, and 123c for the object region 123 in the feature pattern and the object region 123' in the standard pattern as described below based on the sixth embodiment described hereinabove.

R(0)=3 related region 123a (no offset)
R(1)=10 related region 123b (right offset)
R(2)=1 related region 123c (left offset)

Thus, the degree of resemblance NR between the object region 123 of the feature pattern and the object region 123' of the standard pattern is calculated as shown below using the calculated cost C(x) and the degree of resemblance R(x).

$$R(0) - C(0) = 3 - 1.0 = 2.0$$
$$R(1) - C(1) = 10 - (-0.4) = 10.4$$
$$R(2) - C(2) = 1 - 1.7 = -0.7$$

Thus, $NR = \max(2.0, 10.4, -0.7)$
$$= 10.4.$$

As a result, while the difference between the maximum degree of resemblance R(x) and the second highest degree of resemblance related to the object region 123 when calculated by a conventional degree of resemblance calculation method is (Rn(1)−Rn(0)=) 7, when calculated by the degree of resemblance calculation according to the present invention, this difference is (R(1)−R(0)=) 8.4. In other words, the value of the degree of resemblance R(1) associated with the related region 123b in the object region having the same related region number (1) as the related region number (1) of the related region 122b showing a large degree of resemblance Rn(1) (=9) in the near region 122 is emphasized.

This means that the position of the object region 123 in the feature pattern is forcedly offset during the calculation of the degree of resemblance NR relating to the object region 123 in the same direction as the direction in which the position of the near region 122 in the feature pattern is offset with respect to the position of the near region 122' in the standard pattern.

That the position of the object region in the feature pattern is forcedly offset in the same direction as the direction of the offset of the near region does not have any particularly pronounced effect when the subregions comprising the feature pattern as shown in FIG. 17 (a) are uniformly offset in the same direction to the corresponding subregions in the standard pattern as shown in FIG. 17 (b). The effect of this process is pronounced, however, during character recognition with, for example, handwritten characters, in which the direction of the offset of the position of the subregions of the feature pattern to the position of the corresponding subregions of the standard pattern is different in each subregion.

Specifically, when the direction of the offset of only one subregion in a given feature pattern is the opposite of the direction of offset of the other subregions, for example, by making the value of the degree of resemblance associated with the related region which offset the object region in this opposite direction low, and making the value of the degree of resemblance associated with the related region which offset the object region in the same direction high, the position of the subregion offset in said opposite direction is forcedly offset in the same direction as the offset of the position of the other subregions. By thus aligning the offset direction of all subregions forming the feature pattern in the same direction, a high degree of resemblance can be obtained in calculating the degree of resemblance between the feature and standard patterns of the same character.

Figure 20:
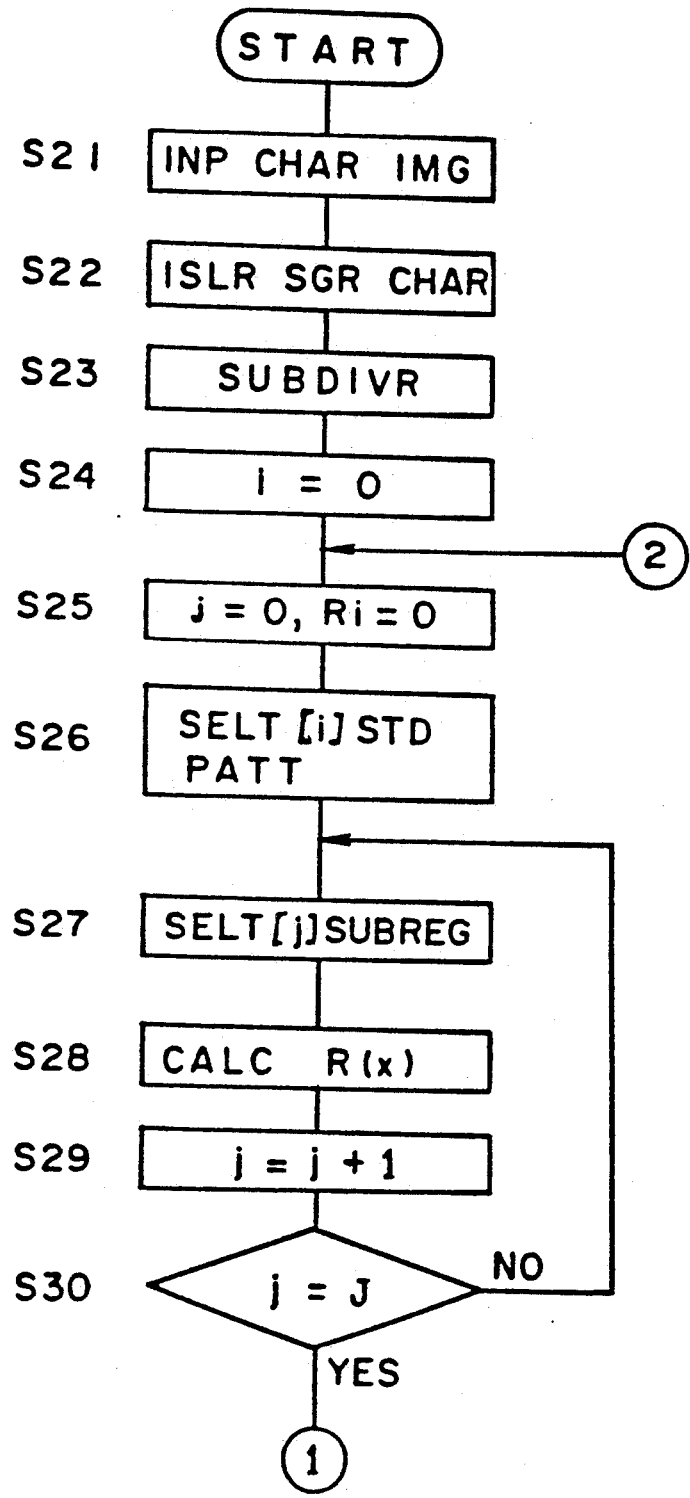
FIGS. 20 (a) and (b) are flowcharts of the degree of resemblance calculation process shown in FIG. 19.
Figure 20B:
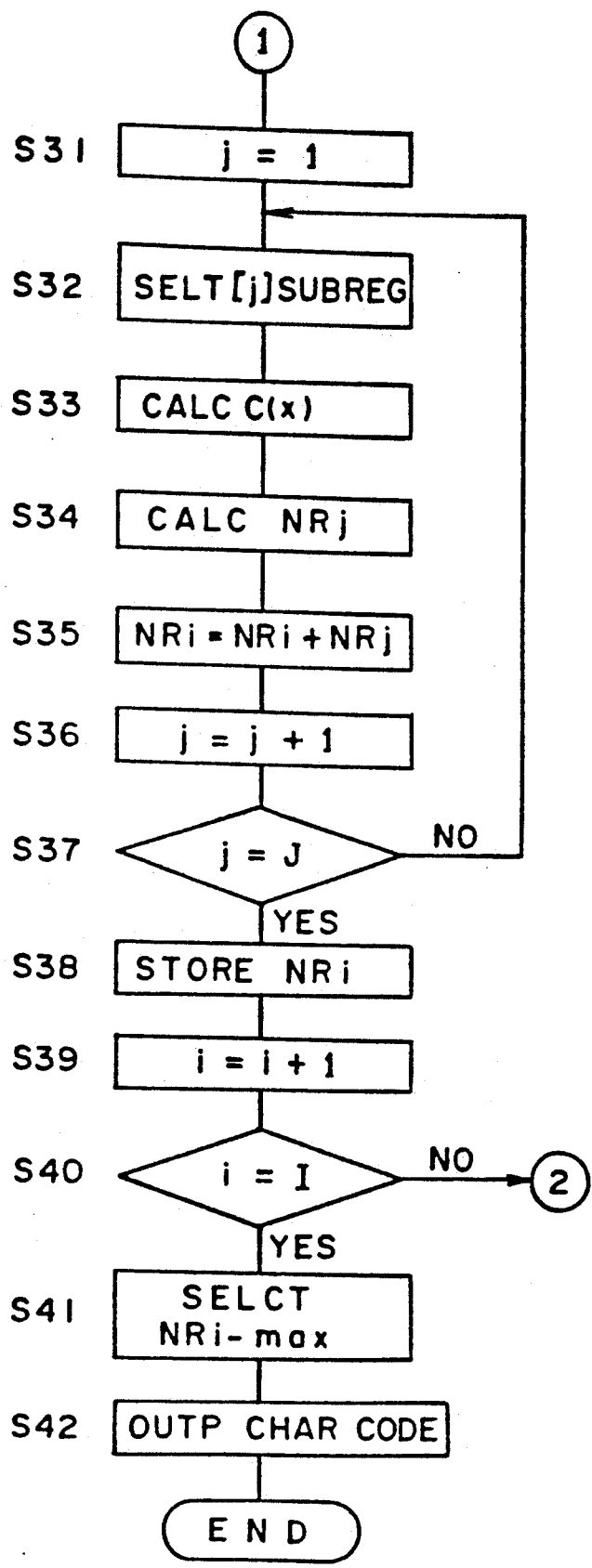

FIGS. 20 (a) and (b) are flow charts of the single character character recognition process executed by the degree of resemblance calculator 108 as controlled by the CPU 111 in this seventh embodiment. This single character character recognition process is described hereinbelow with reference to FIGS. 20 (a) and (b).

In this procedure, steps S21 to S30 in FIGS. 20 (a) and (b) are the procedure whereby the degrees of resemblance R(x) associated with each related region in all subregions forming the feature pattern are calculated, and are approximately the same as steps S1 to S8 in the flow charts in FIGS. 16 (a) and (b). Therefore, a detailed description of this process is herein omitted with only the essential differences described from step S21 to S30.

The character image data read from a provided text document is cut out into single character regions, which are then divided into subregions. Based on the image data of these subregions, the quantified features of each subregion are calculated and stored in the third buffer 107. As a result, a feature pattern for the single character is generated from the quantified features for the single character area and stored in the third buffer 107. (Steps S21–S30)

The standard pattern number [i] to be used in the degree of resemblance calculation is initialized to a value of 0, and the subregion number [j] and the degree of resemblance Ri associated with the number [i] standard pattern are also set to 0. Then, the number [i]

standard pattern is selected from the pattern memory 109, and the number [j] subregions in this [i] standard pattern and the feature pattern are selected. (Steps S24-S27)

Next, the degree of resemblance is calculated for the number [j] subregion in the feature pattern and the number [j] subregion in the [i] standard pattern is calculated. Then, the degree of resemblance R(x) (where x is the related region number in the object region, and is $0 \leq x \leq 2$ in the present embodiment) associated with the related regions of the [j] subregion which is the object region in the feature pattern is calculated, and the result of this calculation is stored in the internal memory of the degree of resemblance calculator 108. (Step S28)

The subregion number [j] is then incremented, and the calculation of the degree of resemblance R(x) associated with each subregion is repeated until the subregion number [j] equals the number of subregions [J] (where J=9 in the present embodiment). The values of the degrees of resemblance R(x) associated with all related regions of the subregions forming the feature pattern are then stored in the internal memory. (Steps S29-S30)

Then when the degrees of resemblance R(x) associated with the related regions of all subregions forming the feature pattern are calculated, calculation of the degree of resemblance NR according to the present embodiment and associated with this subregion is begun based on the calculated degree of resemblance R(x).

At step S31, the subregion number [j] expressing the number of the object region is set to 1.

At step S32, the number [j] subregion is selected as the object region, and the number [j−1] subregion is selected as the near region.

At step S33, from the degrees of resemblance R(x) stored in the internal memory of the degree of resemblance calculator 108 and associated with the subregions forming the single character area, the value of the degree of resemblance R(x) associated with the related regions of the [j−1] subregion is read as the degree of resemblance Rn(y) where y is the related region number in the near region, and is $0 \leq y \leq 2$ in the present embodiment) associated with (each of the related regions of the near region. In addition, the value of the weight matrix W(x,y) corresponding to the current related region number (x,y) is read from the internal memory. Then, based on the degree of resemblance Rn(y) and the value of the weight matrix W(x,y), equation (4) is applied to calculate the cost C(x) associated with each related region of the [j] subregion, which is the object region.

At step S34, from all degrees of resemblance R(x) stored in the internal memory of the degree of resemblance calculator 108, the value of the degree of resemblance R(x) associated with the related regions of the [j] subregion is read as the degree of resemblance associated with each of the related regions of the object region. Then, based on the calculated cost C(x) and the value of the degree of resemblance R(x) associated with the related regions of the [j] subregion, the degree of resemblance NRj for the [j] subregion which is the current object region is calculated according to equation (5).

At step S35, the value of the degree of resemblance NRj for the [j] subregion calculated in step S34 above is added to the degree of resemblance NR between the feature pattern and the [i] standard pattern at that point (the sum of the degrees of resemblance from the 1st to the [j−1] subregion).

At step S36, the subregion number [j] is incremented.

At step S37, it is determined whether the incremented subregion number [j] is equal to the maximum number of subregions J comprising the single character area. If as a result j=J, the procedure advances to step S38; if j does not equal J, the procedure loops back to step S32, the subregion corresponding to the next subregion number is defined as the object region and the degree of resemblance NRj associated with this next object region is calculated.

At step S38, the value of the obtained degree of resemblance NRi is stored in the internal memory of the degree of resemblance calculator 108 because calculation of the degree of resemblance NRi for the feature pattern and the [i] standard pattern is completed.

At step S39, the standard pattern number [i] is incremented.

At step S40, it is determined whether the standard pattern number [i] is equal to the total of standard patterns [I] stored in the pattern memory 109. If i=I, the procedure advances to step S41, and if [i] does not equal [I], the procedure loops back to step S25 so that the degree of resemblance associated with the next standard pattern address is calculated.

At step S41, the maximum degree of resemblance NRi-max is selected from the degrees of resemblance NRi (where $1 \leq i \leq I$) associated with all standard patterns stored in the internal memory.

At step S42, the character code corresponding to the standard pattern corresponding to the Ri-max value selected in step S41 is identified as the character code corresponding to the image of the single character area isolated in step S22. This character code is then output from the interface 110 to an external device, and the single character character recognition process is completed.

When the degree of resemblance NRi for each subregion in the feature pattern generated from the quantified features of the single character area and stored in the third buffer 107 shown in FIG. 12 and the corresponding subregion in the standard pattern stored in the pattern memory 109 is calculated by the degree of resemblance calculator 108, the degree of resemblance Rn(y) associated with the related regions of the near region in the feature pattern is first obtained. Then, based on this degree of resemblance Rn(y) associated with the related regions of the near region and a preset weight matrix W(x,y), the cost C(x) is calculated, which increases the degree of resemblance associated with the related regions in the object region offset in the same direction as the offset of the near regions in the feature pattern, and decreases the degree of resemblance associated with the related regions in the object region offset in the opposite direction to the offset of the near regions in the feature pattern. Then based on this cost C(x), the degree of resemblance R(x) associated with each of the related regions of the object region in the feature pattern is corrected, and the maximum corrected degree of resemblance R(x) associated with with each related region is defined as the degree of resemblance NRj for the corresponding object regions in the feature and standard patterns.

Then, the degrees of resemblance NRj ($1 \leq j \leq J$) for all subregions forming the feature pattern and the corresponding subregions in the standard pattern are added to obtain the degree of resemblance NRj for the feature pattern and the current standard pattern.

Because the value of the degree of resemblance associated with the related regions in the object region offset in the same direction as the offset of the near region in the feature pattern is increased at this time, the effect is the same as forcing the distribution of the quantified features of the object region of the feature pattern to be offset in the same direction as the offset of the distribution of the quantified features of the near region.

Therefore, when calculating the degree of resemblance for the feature and standard patterns of the same character, the following effects are realized.

Specifically, when only one, for example, of the subregions forming the feature pattern is offset to the standard pattern in a direction opposite to that of the other subregions, the position of the quantified features of the object region offset in the opposite direction is forcedly offset in the same direction as the offset of the near region. In effect, all subregions forming the feature pattern are aligned with the offset of each subregion to the corresponding subregion of the standard pattern in the same direction. As a result, the degree of resemblance between the feature and standard patterns of the same character is increased.

To be restated, even in such cases as handwriting wherein the direction of the offset of the character image in each subregion forming the single character area cannot be predicted, the degree of resemblance between the feature and standard patterns can be stably calculated.

In this seventh embodiment, three regions are defined as the related regions of the object region or near region in the feature pattern, but four or more regions may be defined for even more precise compensation.

In this seventh embodiment, only one near region is provided above the object region. However, the present invention shall not be so limited, and the four adjacent subregions at the top, bottom, left, and right of the object subregion, or the eight surrounding subregions including those at the diagonal corners of the object subregion, may be defined as the near regions to calculate the degree of resemblance associated with the object region with even greater precision.

The algorithm used to calculate the cost C(x) in the present shall also not be limited to that described hereinabove. What is essential is that the algorithm increase the degree of resemblance associated with related regions in the object region offset in the same direction as the offset of the near region in the feature pattern, and decrease the degree of resemblance associated with related regions in the object region offset in the opposite direction as the offset of the near region in the feature pattern.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A character recognition device, including an image scanner for optically scanning characters on a document, a single character isolator which isolates image data generated from the image scanner for a single character, a subdivider which divides the image data of this single character into plural subregions, a quantified feature calculator which calculates quantified features of each subregion and generates a feature pattern from the quantified features composing the single character, a degree of resemblance calculator which recognizes a character code corresponding to the character image data based on a degree of resemblance between this feature pattern and a standard pattern, and outputs that character code to an external device, wherein said degree of resemblance calculator calculates
  (1) a first degree of resemblance value between a subregion in the feature pattern and the corresponding subregion in a standard pattern,
  (2) a second degree of resemblance value between an offset subregion, said offset region being offset a specified distance in a specified direction from said subregion in the feature pattern, and said subregion in the standard pattern,
  (3) a third degree of resemblance value between an adjacent subregion in the feature pattern and the corresponding adjacent subregion in the standard pattern,
  (4) a fourth degree of resemblance value between an adjacent offset subregion in the feature pattern and said adjacent offset subregion in the standard pattern;
a cost calculator which calculates a cost parameter associated with said adjacent subregion as a function of the sum of said third and fourth degree of resemblance values;
means for determining a degree of resemblance for each subregion based on the first and second degree of resemblance values and said cost parameter; and
means for selecting said character code based on said degree of resemblance determined for all said plural subregions.

2. The character recognition device according to claim 1, wherein said cost parameter determines the specified direction of the offset, if any.

3. The character recognition device according to claim 1, wherein said cost parameter is calculated by weighting each of the third and fourth degree of resemblance values with a corresponding preset weight and summing the weighted degree of resemblance values to obtain said cost parameter.

4. The character recognition device according to claim 1, wherein said cost parameter is calculated in accordance with the equation $$C(x) = \sum_{y=0}^{2} [Rn(y) \times W(x,y)]$$

where C(x) is said cost parameter associated with said subregion (x); Rn(y) is the degree of resemblance value associated with an adjacent subregion and W(x,y) is a preset weight value,
and wherein the preset weight value has a relatively smaller value when the offset direction of the feature pattern from the standard pattern is the same as the offset direction of the subregion and the adjacent subregion and a relatively larger value when the offset direction of the feature pattern from the standard pattern is opposite the offset direction of the subregion from the adjacent subregion.

5. The character recognition device according to claim 4, wherein said means for determining a degree of resemblance for each subregion determines that degree of resemblance NR in accordance with the equation $$NR = \max_x [R(x) - C(x)]$$

where R(x) is the degree of resemblance value calculated for subregion (x).

6. The character recognition device according to claim 1, wherein said degree of resemblance calculator calculates a fifth degree of resemblance value between another offset region, said another offset region being offset in a direction opposite from said specified direction, and said subregion in the standard pattern, and a sixth degree of resemblance value between another adjacent offset subregion in the feature pattern, said another adjacent offset subregion being offset in a direction opposite from said specified direction, and said adjacent offset subregion in the standard pattern.

7. The character recognition device according to claim 1, wherein said cost parameter increases when said degree of resemblance value for each subregion is offset in the same direction as the offset of said adjacent subregion in said feature pattern and decreases when said degree of resemblance of each subregion is offset in an opposite direction from the offset of said adjacent subregion in said feature pattern.

* * * * *